United States Patent
Wilson

(10) Patent No.: US 9,165,477 B2
(45) Date of Patent: Oct. 20, 2015

(54) SYSTEMS AND METHODS FOR BUILDING ROAD MODELS, DRIVER MODELS, AND VEHICLE MODELS AND MAKING PREDICTIONS THEREFROM

(71) Applicant: Christopher Kenneth Wilson, Emerald Hills, CA (US)

(72) Inventor: Christopher Kenneth Wilson, Emerald Hills, CA (US)

(73) Assignee: Vehicle Data Science Corporation, Emerald Hills, CA (US)

( * ) Notice: Subject to any disclaimer, the term of this patent is extended or adjusted under 35 U.S.C. 154(b) by 0 days.

(21) Appl. No.: 14/563,664

(22) Filed: Dec. 8, 2014

(65) Prior Publication Data

US 2015/0266455 A1 Sep. 24, 2015

Related U.S. Application Data

(60) Provisional application No. 61/912,775, filed on Dec. 6, 2013.

(51) Int. Cl.
| | |
|---|---|
| *B60T 8/32* | (2006.01) |
| *G09B 19/10* | (2006.01) |
| *G01C 21/26* | (2006.01) |
| *G08G 1/00* | (2006.01) |

(52) U.S. Cl.
CPC ............... *G09B 19/10* (2013.01); *G01C 21/26* (2013.01); *G08G 1/20* (2013.10)

(58) Field of Classification Search
CPC .... G01C 21/30; G01C 21/3469; G01C 21/26; G09B 19/10; G08G 1/20
USPC ............. 701/93, 96, 117, 400, 468, 409, 538, 701/451; 340/988, 990, 438, 439, 905, 340/995.1
See application file for complete search history.

(56) References Cited

U.S. PATENT DOCUMENTS

| | | | |
|---|---|---|---|
| 5,228,305 A * | 7/1993 | Vogt ................................ | 62/133 |
| 5,508,929 A * | 4/1996 | Harada ........................... | 701/48 |
| 5,594,645 A * | 1/1997 | Nishimura et al. ............. | 701/96 |
| 5,948,042 A | 9/1999 | Heimann et al. | |
| 6,047,234 A | 4/2000 | Cherveny et al. | |
| 6,366,851 B1 | 4/2002 | Chojnacki et al. | |
| 6,385,539 B1 * | 5/2002 | Wilson et al. ................. | 701/468 |
| 6,510,382 B2 | 1/2003 | Wilson | |
| 6,516,267 B1 | 2/2003 | Cherveny et al. | |

(Continued)

FOREIGN PATENT DOCUMENTS

| | | |
|---|---|---|
| DE | 10030932 A1 | 1/2002 |
| WO | 2010011806 A1 | 1/2010 |

(Continued)

*Primary Examiner* — Gertrude Arthur Jeanglaud
(74) *Attorney, Agent, or Firm* — Ascenda Law Group, PC

(57) ABSTRACT

Systems and methods for building road models, driver models, and vehicle models and making predictions may use driving data received from a plurality of vehicles being driving along a path by a driver. The driving data including a minimum of vehicle location preferably supplemented by data related to the time of observations, vehicle dynamics, and various vehicle sensors. The received data may be categorized into a plurality of maneuvers and a plurality of variables that describe the maneuvers and the received driving data may be identified. A road model may then be built for the path based on the identified variables and maneuvers and the behaviors of a particular driver compared to the road model to assess their driving and intervene as appropriate.

20 Claims, 11 Drawing Sheets

(56) References Cited

U.S. PATENT DOCUMENTS

| | | |
|---|---|---|
| 6,674,434 B1 | 1/2004 | Chojnacki et al. |
| 8,073,617 B2 | 12/2011 | Nakamura |
| 8,359,156 B2 | 1/2013 | Guo et al. |
| 8,712,676 B2 * | 4/2014 | Hiestermann et al. ........ 701/119 |
| 8,868,335 B2 | 10/2014 | Nowak et al. |
| 2006/0155464 A1 | 7/2006 | Smartt |
| 2012/0022781 A1 | 1/2012 | Wilson |
| 2012/0053823 A1 | 3/2012 | Wilson |
| 2012/0095682 A1 | 4/2012 | Wilson |
| 2012/0209518 A1 | 8/2012 | Nowak et al. |
| 2012/0277993 A1 | 11/2012 | Mund |
| 2013/0030690 A1 | 1/2013 | Witmer |
| 2013/0046466 A1 * | 2/2013 | Yucel et al. ................... 701/538 |
| 2013/0226622 A1 | 8/2013 | Adamson et al. |

FOREIGN PATENT DOCUMENTS

| | | |
|---|---|---|
| WO | 2010040401 A1 | 4/2010 |
| WO | 2010147730 A1 | 12/2010 |

* cited by examiner

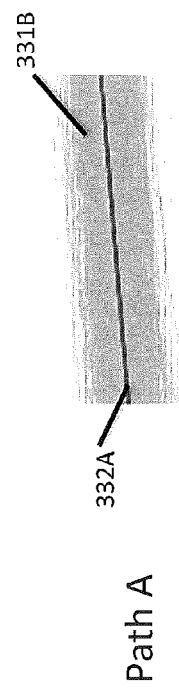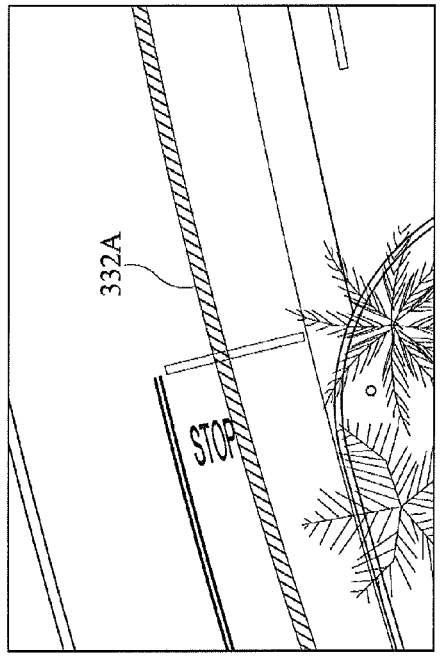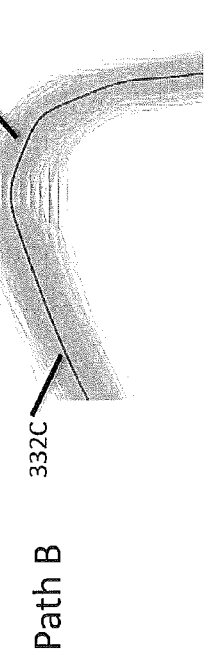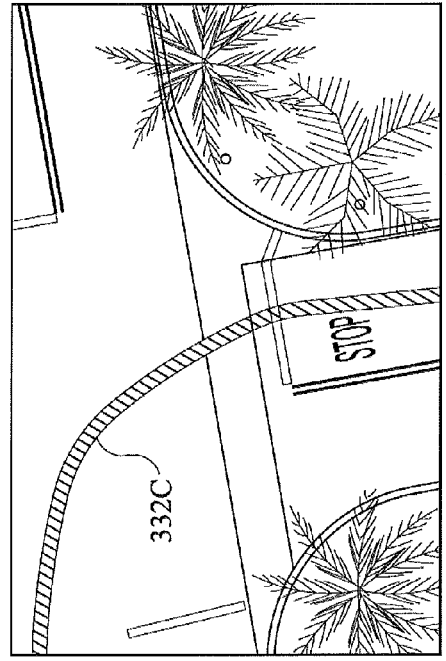
Figure 3E
Figure 3F
Figure 3G
Figure 3H

SYSTEMS AND METHODS FOR BUILDING ROAD MODELS, DRIVER MODELS, AND VEHICLE MODELS AND MAKING PREDICTIONS THEREFROM

RELATED APPLICATION

This application is NONPROVISIONAL of U.S. Provisional Patent Application No. 61/912,775 entitled "System and Method for Characterizing Roads, Driver and Vehicle Sensor Behaviors Based on Criteria Relative to Peers" filed on 6 Dec. 2013, which is incorporated herein by reference in its entirety.

FIELD OF THE INVENTION

The present invention relates to methods, apparatus, and systems building road models, driver models, and vehicle models and making predictions therefrom.

BACKGROUND

Traditionally, driving environments are described using traditional maps. These maps provide a geographical representation derived from sensors on a well-equipped survey vehicle. The features that are detected by these vehicles are generally visual, such as paint markings detected by cameras, and spatial, curbs and buildings detected by cameras or LIDAR. In all cases the features are static. The features represented in the map are available to a single survey vehicle when it passes and they are generally stable on timescales of years corresponding to the time needed to create, distribute and use the resulting map. Features such as average speed or the distribution of speeds are not available to the survey vehicles and hence are not intrinsically part of these maps. Speed attributes may be later added to a map based on observations from vehicles or speed limit signs, but these are used for navigation and planning purposes and are only available at the link level (that is the time to traverse a section of road connecting two intersections).

In the past, practitioners have attempted to derive driver behavior models and predict driver patterns (speed, position, acceleration, etc.) based on a map (as described above), sensor data available in the vehicle (radar, vision system, etc.), and/or sensors external to a vehicle (hereafter identified as "external observations"). These models are often used in traffic simulations to describe the motion of simulated vehicles (based on traditional map data), for the evaluation of new vehicle sensors and systems in simulated environments, and for predicting a future vehicle state, as well as other purposes.

For example, curve speed warning systems provide a warning to a driver if he or she is entering a curve at a speed that is judged to be unsafe. In the simplest case, the speed is judged unsafe if the lateral acceleration is, or is expected to be in some short time interval, above some threshold, say 0.4 g, this lateral acceleration is derived from the curvature of the road and the (expected) speed of the vehicle by the relation $a=v/r$, where r is the radius of curvature of the road, a is the acceleration, and v is the speed This approach works well in many cases, however, there are cases where this method results in erroneous warnings of excessive speed, which, if low, may result in annoyance to the driver, or, if the computed speed is too high, a lack of warning when warning is appropriate. The errors can result from one of several mechanisms. One reason for calculating an incorrect speed is errors in the map. Curvature can be very sensitive to small errors in position for the road centerline, especially for very tight curves, thus even small relative errors in position between points in the map may result in significant errors in the maximum speed. The second reason for errors is that the road may be banked in such a way as to allow a higher or lower speed. Often bank angle of the road is not included in the map data. A third reason for errors is compound curves were there may be several different curvatures in close succession making it very difficult for the algorithm to properly compute an optimum speed. Errors may also be caused because drivers do not follow the centerline geometry e.g. they cut the curve resulting in a lower radius of curvature than that in the database. Humans may select a higher or lower speed due to other considerations as well, such as the width of the shoulder, the surface of the road, the ability to see the full extent of a curve, etc. None of these factors are included in the traditional map database. Additionally some drivers are better than others, or at least drive faster, thus a proper speed alert for one driver is an annoyance alarm for another.

Additionally, existing models have limited fidelity, due in part to the complexity of human driving behaviors, but also to the existence of many factors a human takes into consideration that are not available to sensors and algorithms used for traditional driver behavior modeling, such as road surface, weather conditions, time of day, vehicle sightlines, etc. The fidelity of existing behavior models are limited by the content available in existing map databases.

SUMMARY

Computer implemented systems and methods for building road models, driver models, and vehicle models and making predictions therefrom are therein described. Driving data from a plurality of vehicles being driving along a path may be received. Each of the vehicles of the plurality may be driven by a driver. In some circumstances, the driver may be an autonomous or semi-autonomous driving machine or driving assistance device.

The data may be categorized into a plurality of maneuvers and a plurality of variables that describe the maneuvers and the received driving data may be identified. A road model may be built for the path based on the identified variables and maneuvers. The road model may include a set of reference trajectories for a subsequent vehicle being driven at an identical or similar location along the path.

Driving data may then be received from a vehicle separate from the plurality of vehicles as it is being driven on the path by its respective driver and one or more characteristics of the driver of the plurality of drivers using the driving data received from the vehicle. The characteristics of the driver may be compared to the road model to determine driver behavior and a determination as to whether the driver behavior is consistent with the road model may be made. An action may then be executed in the vehicle responsively to the determination of whether the driver behavior is consistent with the road model, the predetermined action being at least one of providing a message to the driver and automatically adjusting a manner in which the vehicle is driven. Exemplary ways of adjusting the manner in which the vehicle is driven include braking, continued application of cruise control, removal of cruise control, redirecting a trajectory of the vehicle, accelerating the vehicle, modifying an operation of sensor systems resident in the vehicle, modifying an operation of actuator systems resident in the vehicle, modifying a setting of the vehicles suspension apparatus, adjusting the operation of headlights resident in the vehicle, adjusting the operation of turn indicators, and/or adjusting the configuration of one or more components of the vehicle's powertrain. Adjusting the manner in which the vehicle is driven may be responsive to, for example, the road model, the characteristics of the driver, driver behavior, and a driver preference.

In some embodiments, the method may further include building a driver model for the driver using the driver behavior, receiving driver data from a third party, and updating the driver model to include the driver data received from the third party. Demographic data about the driver may be received and the driver model may be segmented from the received data based on the received demographic data.

The driver behavior may be compared with the driver model and it may be determined whether the driver behavior is consistent with the driver model. The execution of the predetermined action may be updated in the vehicle responsively to the determination of whether the driver behavior is consistent with the driver model.

In some embodiments, a risk score may be assigned to the driver responsively to the comparison of the driver behavior to the road and the driver models, wherein the predetermined action is responsive to the risk score.

The road models may include maneuvers, stopping locations, and predetermined actions to be performed upon approaching a stopping location is to decrease the speed of the vehicle. For example, a rate at which the speed of the vehicle is decreased, a location for beginning decreasing the speed, a location for coming to a stop are determined using at least one of the road model, the characteristics of the driver, driver behavior, and a driver preference.

In some embodiments, the road model may be dynamically updated and/or changed based on, for example, conditions (e.g., environmental, traffic, road construction, etc.) present on the path.

In another embodiment, one or more characteristics of a vehicle of the plurality of vehicles driven by the driver may be determined based on the driving data received from the vehicle. The characteristics of the vehicle may be compared to the road model to determine vehicle behavior and a vehicle model for the vehicle may be built using the driver behavior. At times, vehicle data may be received from a third party (e.g., insurance company, vehicle manufacturer) and the vehicle model may be updated to include the vehicle data received from the third party.

In some instances, vehicle characteristic data relating to the vehicle may be received and the vehicle model may be updated based on the received vehicle characteristic data relating to the vehicle.

In one embodiment, the vehicle behavior may be compared with the driver model and the road model. It may then be determined whether the vehicle behavior is consistent with the driver model and the road model and the execution of the predetermined action in the vehicle may be updated responsively to the determination of whether the driver behavior is consistent with the driver model and the road model. In some circumstances, a risk score may be assigned to the vehicle responsively to the comparison of the vehicle behavior to the road model, the driver model, and the vehicle model, wherein the predetermined action is responsive to the risk score.

In an alternative embodiment, a prediction regarding how the vehicle will be driven along the path based on at least one of the road model and the driver behavior and the execution of the predetermined action may be updated in the vehicle responsively to the prediction.

In one embodiment, a driver model may be selected from a plurality of previously generated driver models using at least one of a characteristic of the driver driving and the driver behavior. The characteristics of the driver may be compared to the selected driver model to determine driver behavior. It may then be determined whether driver behavior is consistent with the driver model and executing a predetermined action in the vehicle responsively to the determination, the predetermined action being at least one of providing a message to the driver and automatically adjusting a manner in which the vehicle is driven.

In another embodiment, a plurality of road models for the path have been generated and a road model of the plurality of road models may be selected prior to the comparison of the driver to the road model to determine driver behavior. The characteristics of the driver may then be compared to the selected road model to determine driver behavior. At times, herein the road model may be selected responsively to a driver characteristic, the driver behavior, a vehicle characteristic, an environmental condition associated with the path, and a traffic congestion characteristic of the path.

BRIEF DESCRIPTION OF THE DRAWINGS

The present invention is illustrated by way of example, and not limitation, in the figures of the accompanying drawings, in which:

FIGS. 3E-3I depict various examples of road models consistent with embodiments of the present invention.

DETAILED DESCRIPTION

Figure 1:
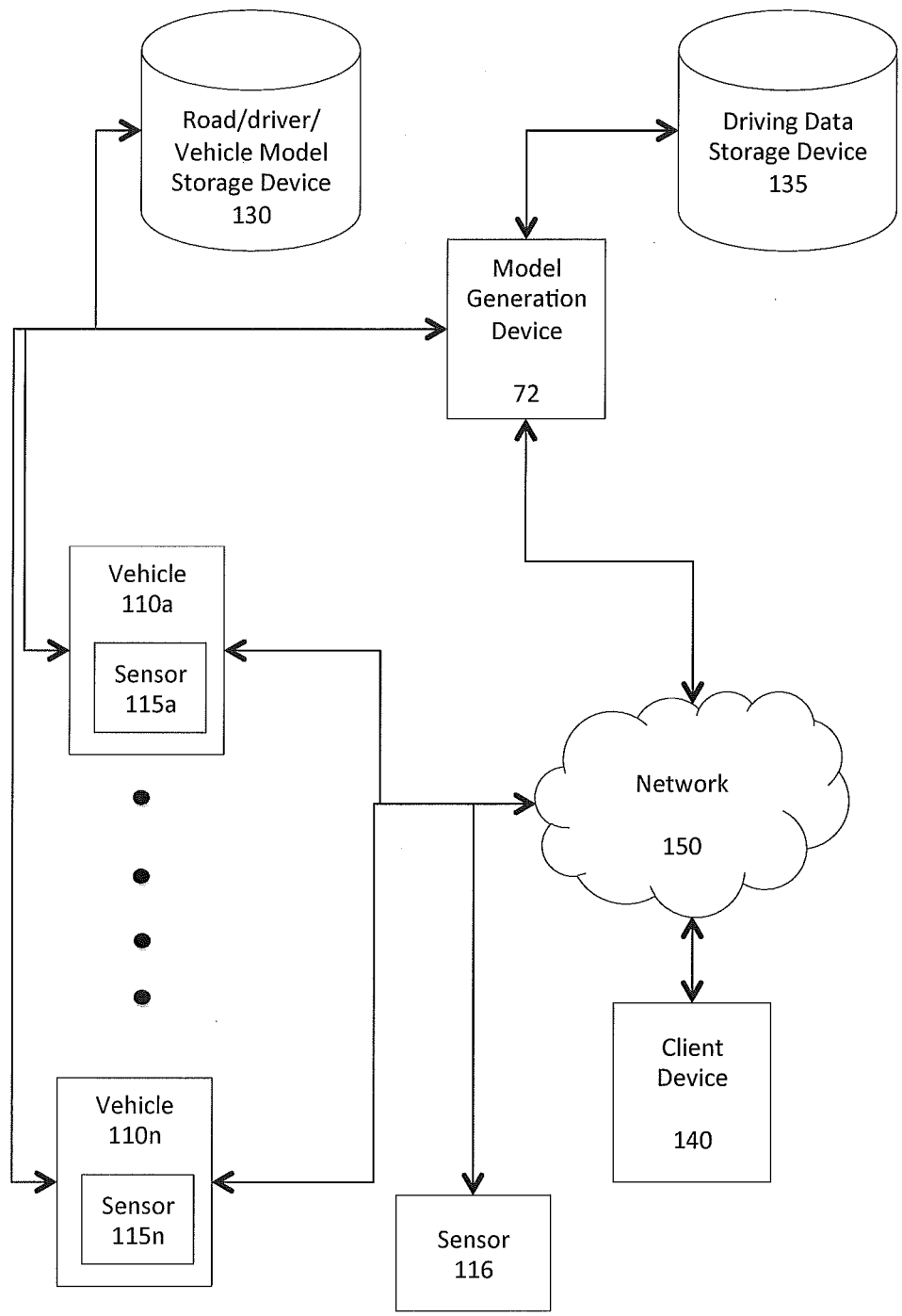
FIG. 1 illustrates an exemplary system within which embodiments of the invention may be instantiated.

The present invention provides systems and methods for building behavioral models of roadways, vehicles, and drivers based on a map built from observations of driver behavior (not observations of the physical environment). In this way, models may be built and/or selected for use in certain instances, based on the behavior of other peer drivers and/or vehicles as they drive along a particular path rather than traditionally available geographic and cartographic information.

For example, when generating a curve speed warning driving data from a plurality of vehicles that previously drove the path of the curve at issue may be analyzed in order to determine the vehicle's individual and collective speeds as well as other factors effecting the driving experience (e.g., vehicle type, driver type, weather conditions, time of day) to generate a road model for the path. In the implementation of a curve speed warning system, a speed deemed to be unsafely high four traveling along the path (e.g., the $85^{th}$ percentile speed for the path) may be established as a warning speed and when drivers meet or exceed the warning speed, the driver may be notified or otherwise warned that the speed of the vehicle is unsafely high.

In some circumstances the road model for the curved path may incorporate additional factors, such as driver-specific behavior, driver preferences, published speed limits, and vehicle specifications. Curve speed warning data may then be revised based on these factors and the enriched road model. This approach lends itself to personalization of both road model and/or driver model generation as well as when and what notifications may be sent to a driver based on driver and/or vehicle behavior.

The present invention provides the ability to generate alarms only when true unsafe conditions are present and, in this way, serves to reduce false alarms that may be presented to a driver. This capability is enabled by use of a road model built using received driving data, such as a radar sensor used for object characterization. Object characterization is widely used in intelligent autonomous or semiautonomous vehicles to gain some understanding of objects ahead of the vehicle in order to determine if some action is necessary. Radar is often used to identify vehicles or obstacles in the lane ahead, stopped vehicles being particularly difficult to detect since there is no relative motion to the radar returns from the ground. Using traditional methods, very sophisticated algorithms are typically required to differentiate between observed objects, such as stopped car and a manhole cover in a road, or a metal pipe positioned beneath the path. The road, driver, and/or vehicle models described herein use the behavior of many radar sensors as they pass a section of road and to learn, without the use of that under certain circumstances (described in part by the road indices in combination with sensor indices) an alarm can be expected which is not from a hazard, or conversely that most vehicles do not see a return so it is likely something new is there that may warrant an alarm, or at least more analysis by the vehicle and/or driver. This information may serve to reduce the processing power needed for the sensor systems, and may reduce false alarms and increase the probability of accurate positive detections.

In many instances, the road, driver, and/or vehicle models described herein may be built without the need for survey vehicle or traditional mapping data, thereby the cost and time required to generate the models is significantly reduced when compared with traditionally generated maps. The road, driver, and/or vehicle models are built using vehicle and driver behavior data directly thus; these models do not need to be inferred from geometry or other factors present in a traditional map. Instead, the road, driver, and/or vehicle models contain ranges of normal driving behaviors in any given situation.

Turning now to FIG. 1 depicts a block diagram of an exemplary system 100 in which embodiments of the present invention may be executed. Driving data may be collected by a variety of sensors 115a-115n which may be affixed to or resident in a vehicle, such as vehicles 110a-110n and sensor 116, which is not coupled to a vehicle (i.e., an external sensor). Exemplary sensors 115a-115n and 116 include accelerometers, odometers, optical observation equipment (e.g., a camera), sound observation equipment (e.g., a microphone), lidar equipment, radar equipment, and ultrasonic sensors.

In some embodiments, sensors 115a-115n and 116 may store collected driving data locally for eventual transmission to a model generation device 72 and/or may communicate the collected driving data to model generation device 72 via one or more networks 150 in real time or in close to real time (i.e., as the vehicle is being driven). Exemplary networks 150 include the Internet and networks facilitated by radio communication.

Vehicles 110a-110n will typically be motorized vehicles, such as a car, truck, and motorcycle. However, in some instances non-motorized vehicles 110a-110n, such as bicycles, strollers, or animals may also be used. In most embodiments, driving data will be collected from a large plurality of vehicles 110a-110n (e.g., 100-10,000) but this may not always be the case. In some embodiments, 110a-110n may be enabled with autonomous or semi-autonomous driving capabilities.

Driving data communicated by sensors 115a-115n and/or 116 may be received by a driving data storage device 135 and/or model generation device 72. Driving data storage device 135 may serve as a data storage device for storing the received driving data. Model generation device 72 may use they received driving data to generate one or more road models, driver models, and/or vehicle models in accordance with the processes described below. Once the road models, driver models, and/or vehicle models are generated, they may be stored in a road/driver/vehicle model storage device 130.

In some embodiments, a client device 140 operated by, for example, a vehicle driver and/or an administrator of system 100 may be used to access, for example, model generation device 72, Road/driver/vehicle model storage device 130, and/or driving data storage device 135 in order to, for example, access road, driver, and or vehicle models or provide information for use in the generation of these models (e.g., driver identifying information, GPS coordinate information, driver demographic information, etc.). In some instances, a third party, such as an insurance company, a transportation agency, and/or a traffic monitoring service, may operate client device 140. This information may be used to update or otherwise modify one or more road, driver, and or vehicle models.

Figure 2:
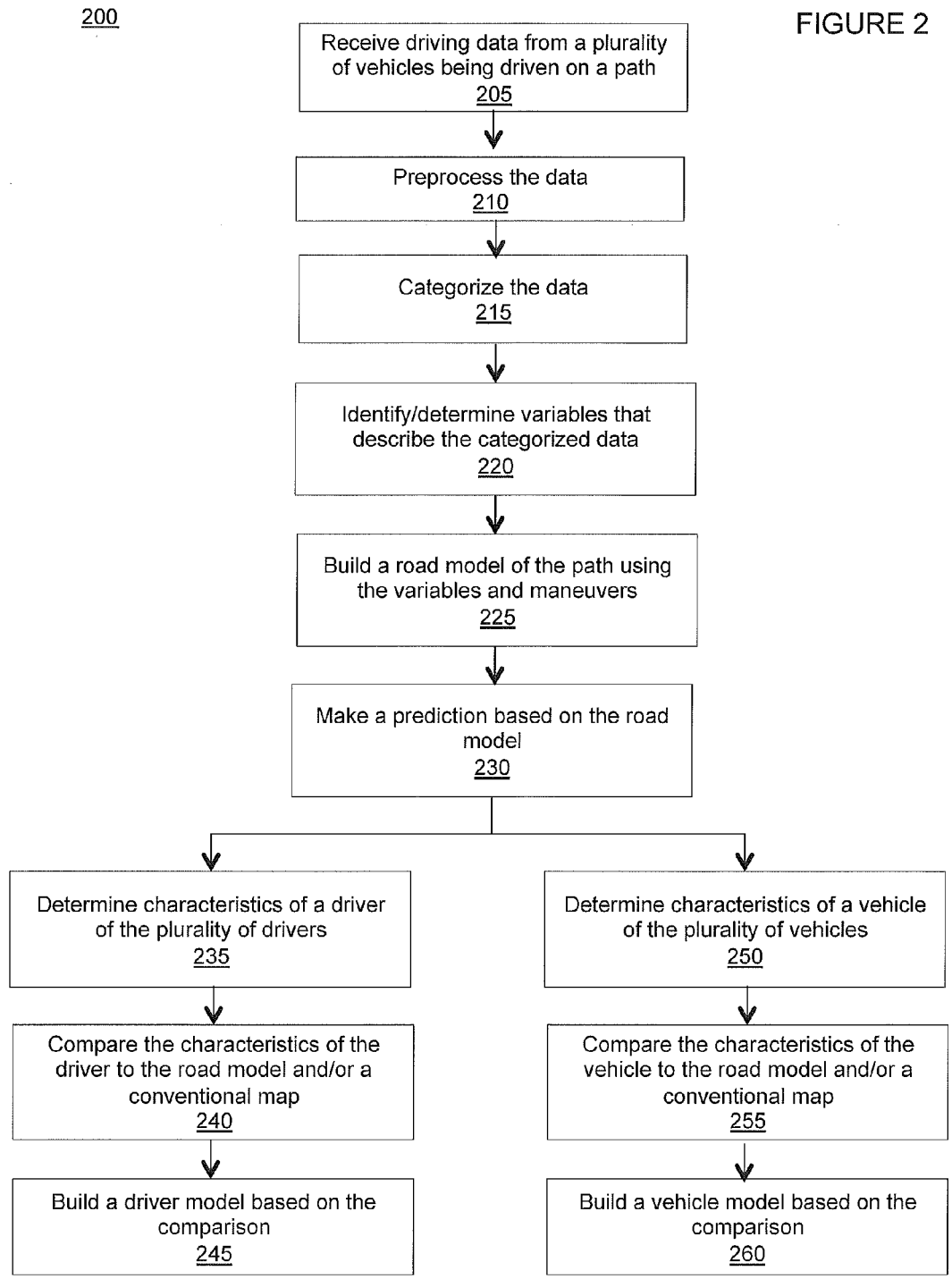
FIG. 2 is a flowchart illustrating an exemplary process for building a road model, driver model, and/or vehicle model consistent with embodiments of the present invention.

FIG. 2 depicts a process 200 for determining building a road model, a driver model, and/or a vehicle model. Process 200 may be executed by, for example, any of the systems and/or system components discussed herein.

In step 205, driving data from a plurality of vehicles, such as vehicles 110a-110n and/or sensors, such as sensors 115a-115n driving on a path may be received by, for example, a model generation device such as model generation device 120. A driving path (referred to herein as "path") may include a roadway, a set of roadways, a track, or any other geographical path that a plurality of vehicles traverse in approximately the same manner. The driving data may include, for example, vehicle trajectory and other kinematic data (e.g., vehicle position at a particular time, vehicle speed, a direction of travel for the vehicle, etc.). The driving data may be collected from a plurality of vehicles/sensors driving on a particular roadway or path and/or a plurality of vehicles driving on a plurality of different roadways or paths.

In some embodiments, the received data may include information that may impact driving behaviors, such as, vehicle parameters/characteristics (vehicle type, weight, size, power, load etc.), driver information (gender, age, skill level, amount of sleep, health, driving history), weather information (rainy, icy, fog, temperature, fair, lighting and sun angle), roadway information (speed limit, road type, traffic congestion conditions, maintenance and incident information) and other information that may impact driving behaviors. The driving data may be relatively static, such as roadway or waterway positions, or dynamic, such as traffic conditions or vehicle speed.

Next, the received data may be preprocessed in order to, for example, remove errors, anomalies, and/or statistically irrelevant or outlier data (step 210). In some embodiments, the preprocessing may also act to convert the received data into more favorable data types before being processed with the ensuing pattern recognition algorithm.

The preprocessing of step 210 may include execution of various statistical processes such as, but not limited to, data smoothing, outlier detection, resampling, integration, differentiation, Fourier analysis, frequency analysis, and/or various conditioning techniques that are well known in the art. In some embodiments, the type of preprocessing executed may be partially or wholly dependent on the type, source, or amount of data received in step 205. For example, when the data received is position data, the preprocessing may include smoothing or deletion of points that do not correspond with viable vehicle movement parameters.

In step 215, the preprocessed data may be categorized to form data clusters and/or recognize patterns, such as data type (e.g., vehicle type, position, time of day, location, road type, data sources and quality), data source (on-board vehicle sensor, external sensor, GPS satellite), and/or a plurality of maneuvers. In some embodiments, step 215 may include processing the data using one or more data pattern recognition algorithms.

Exemplary data clustering techniques include K-means, Nearest Neighbor, Hierarchical Clustering, Self Organizing Maps, Principal Components or other combinatorial algorithms as described in the literature (for example "The Elements of Statistical Learning: Data Mining, Inference, and Prediction" by Hastie, Tibshirani and Friedman, Springer Series in Statistics). An example of a data clustering technique applied to received data is provided by FIG. 3D, which is discussed in greater detail below.

A maneuver may include a particular driving maneuver executed by a vehicle or driver when driving along a particular path or path feature (e.g., straightaway, soft left turn, hard left turn, merge into a roadway lane, or swerve left). The specific maneuvers and the total number of maneuvers generated by the execution of step 215 may be dependent upon, for example, the qualities, quality, and/or type of the data received at step 205.

In some embodiments, a taxonomy of driving maneuvers, data types, and/or data clusters may be developed as a result of the execution of step 215. This taxonomy may later be used for developing a road model. On some occasions, the selection of driving maneuvers, data types, and/or data clusters to be included in the taxonomy may be performed iteratively with performance of the ensuing variable selection process and/or the preprocessing steps designed to optimize the system performance and/or optimize the relevance of the data to the road model. For example, when generating the taxonomy of maneuvers, various similar maneuvers, described by similar parameters and indices, may be combined, split or redefined for improved system performance.

In step 220, variables that describe the patterns, data clusters, categorized data, maneuvers and/or un-segmented data streams of relevance to a particular road model may be identified. Exemplary variables describe position, time and various derivatives (speed, acceleration, jerk along all vehicle axes, etc.). These variables may then be combined through any of several machine learning algorithms which are the generally known to those familiar with the state-of-the-art and widely described in the literature (as Hastie mentioned above).

Variables may be identified via any appropriate process including, but not limited to, unsupervised techniques, such as principal component analysis, which may be used to identify specific variables and reduce the overall number of variables by eliminating highly correlated variables. In some embodiments, the elimination of highly correlated variables may be performed during an initial stage of road modeling (described below) in order to develop an appropriate description of the aggregated data. Curve fitting and other smoothing approaches may also be utilized when identifying variables or building a road model, especially when building geometric descriptions of the data.

Figure 3A:
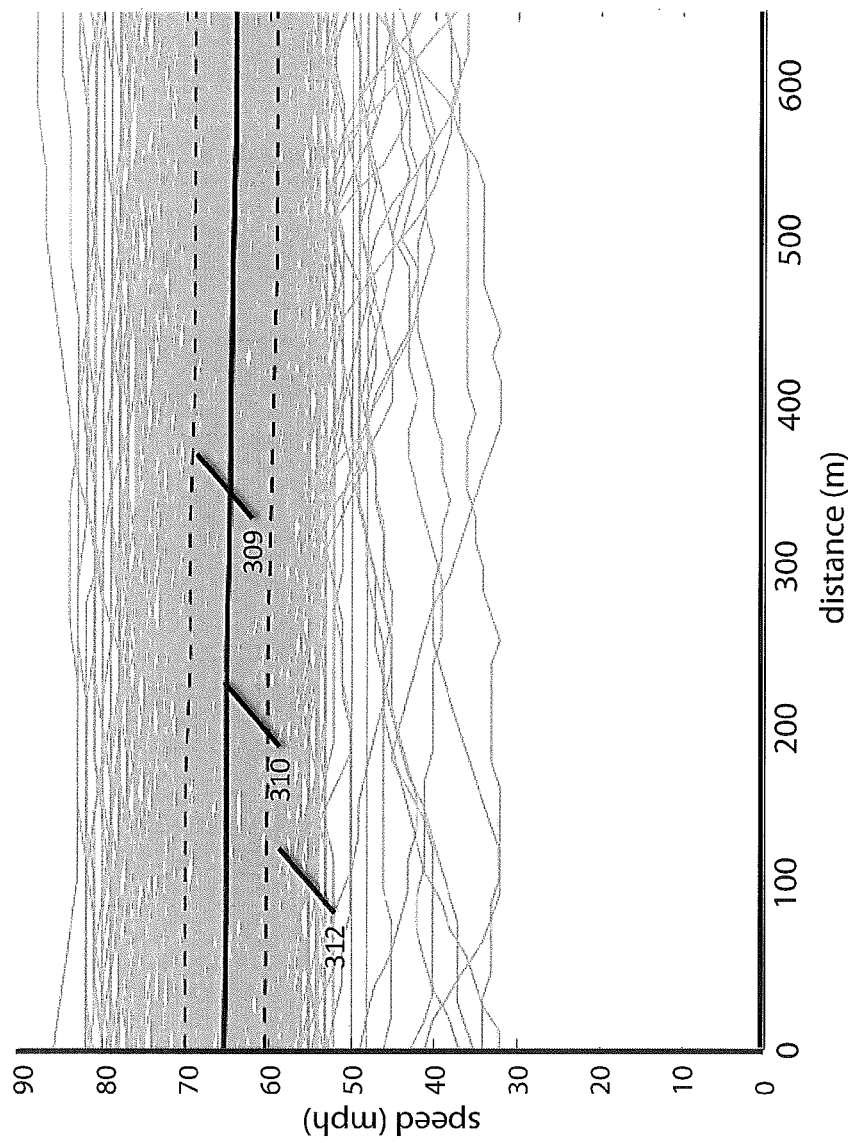
FIGS. 3A-3D depict various examples of received and/or processed driving data consistent with embodiments of the present invention.

FIGS. 3A-3D illustrate various examples of received and/or processed driving data. For example, FIG. 3A illustrates a graph 301 of the free flow speed of vehicles as they travel along a path in terms of speed (measured in miles per hour (mph)) verses distance traveled (measured in measured in meters (m)) along the path. Graph 301 depicts both the raw speed as a function of distance data as received in step 205 as well as the median speed for the path 310. Graph 301 also depicts the 75th percentile of the median speed for the path 311 and 25th percentiles of the median speed for the path 312. The median speed as well as the 75th and 25th percentiles thereof may be determined, for example, in steps 210-220.

Figure 3B:
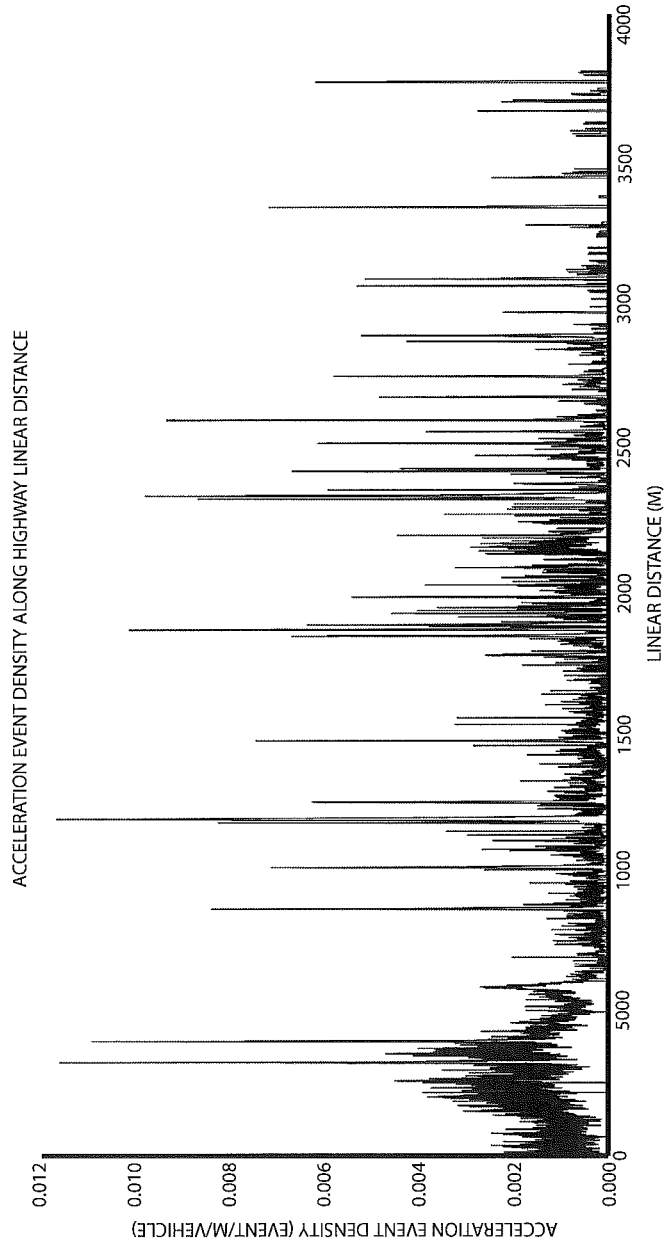

FIG. 3B illustrates a graph 302 depicting acceleration event density along a linear path. The acceleration event density is measured in terms of the number of acceleration events per meter per vehicle and the linear distance of the path is measured in meters. Graph 302 shows the number of acceleration events that occur at various positions along the path. This information provides an indication of where, along the path, peaks of acceleration events occur and where, along the path, acceleration events do not tend to occur.

Figure 3C:
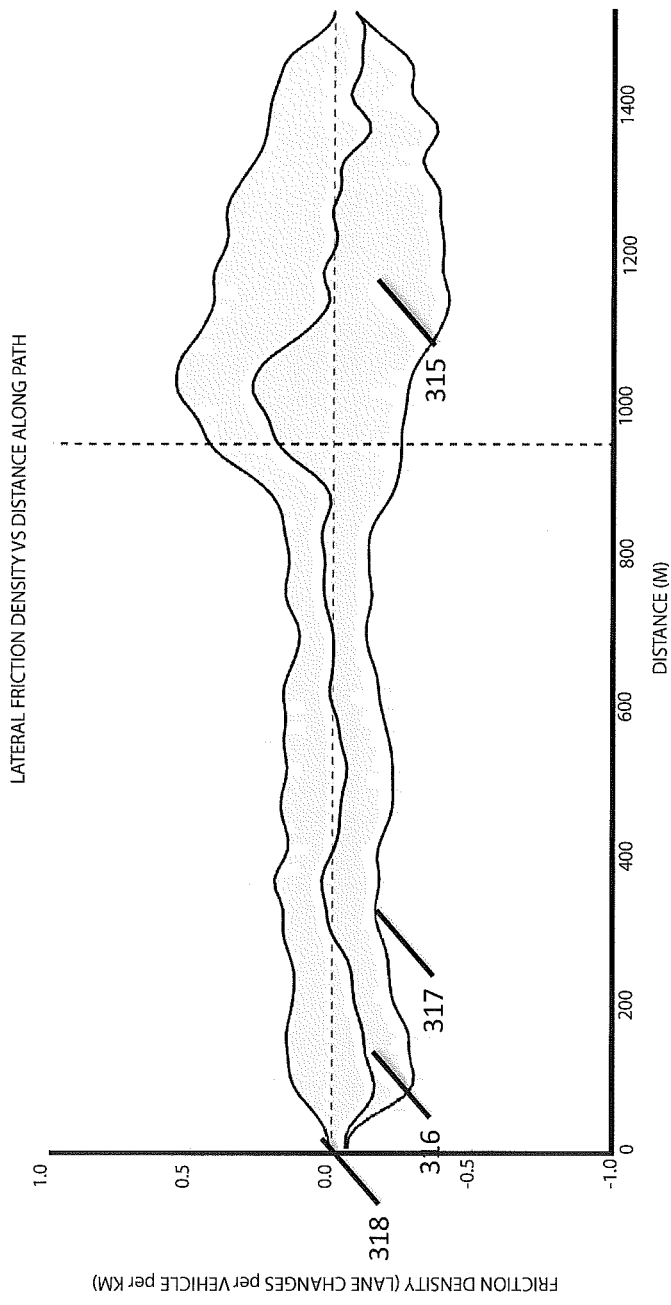

FIG. 3C illustrates a graph 303 depicting lateral friction density verses distance along a path. Friction density is measured in terms of lane changes per vehicle per kilometer (km) and distances or positions along the path are measured in terms of meters. Graph 303 depicts the received, raw driving data 315, indicating the number of lane changes that occur at various positions along the path as well as the net lateral friction density 316, one standard of deviation above the net lateral friction density 318 and one standard of deviation below the net lateral friction density 317.

Figure 3D:
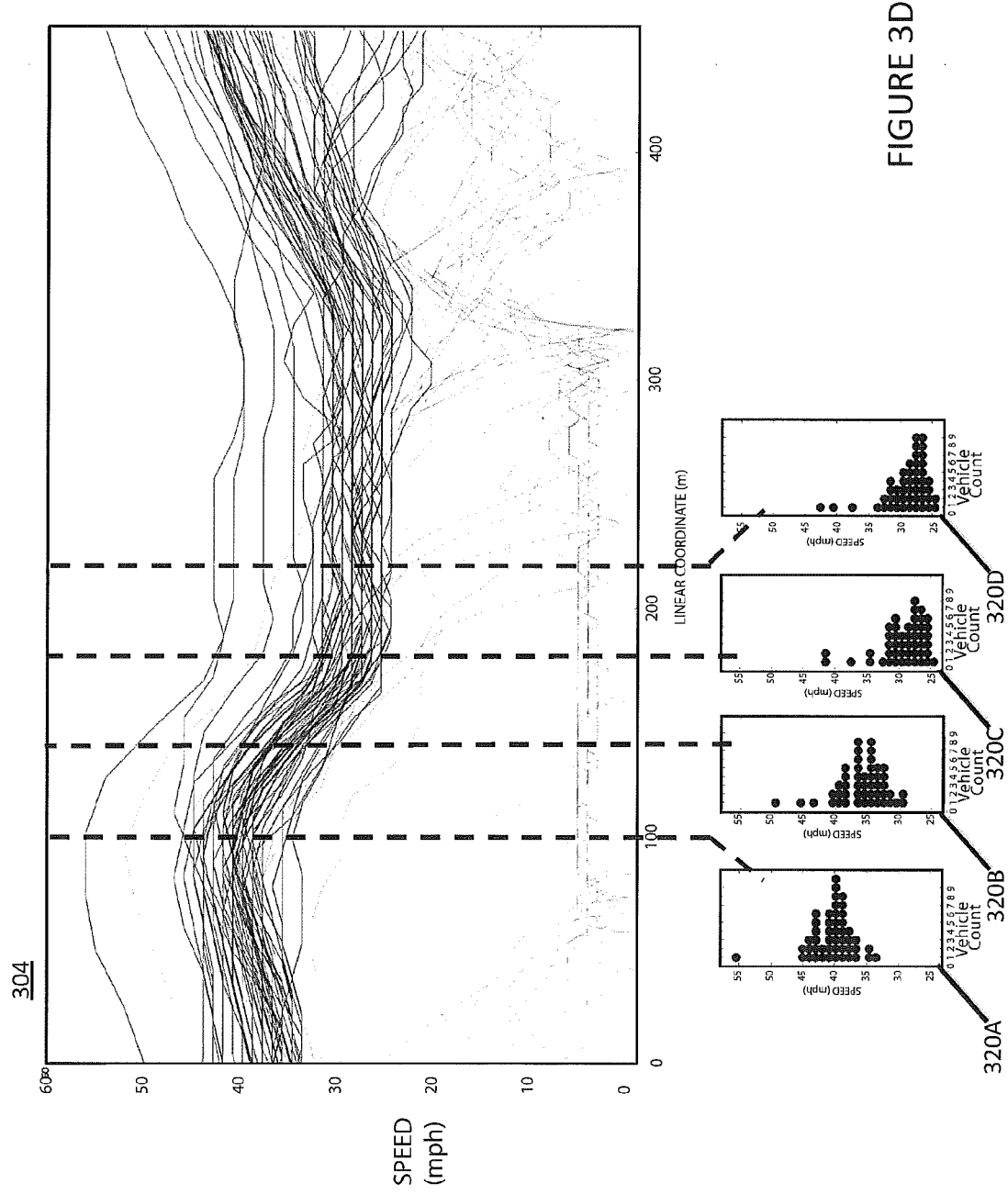

FIG. 3D illustrates a graph 304 depicting free flow speed of vehicles as they travel along a path in terms of speed (measured in miles per hour (mph)) verses distance traveled (measured in measured in meters (m)) along the path, wherein the free flow speed data is subject to statistical clustering. Graph 304 depicts four speed cluster charts 320A-320D generated using the speed of vehicles at various distances along the path. Speed cluster charts 320A-320D depicts the speed (mph) of a vehicle verses vehicle count and provides more detailed information with regard to the speed of individual vehicles at a particular distance than graph 304.

Next, a road model that defines or otherwise maps out how the received driving data, categorized data, and identified/determined variables apply to various locations along a particular path so as to provide a detailed model of many facets of the path aside from and/or in addition to the cartographic and geographic features of the path may be built (step 225). In some instances, the road model may also include a set of reference trajectories for a subsequent vehicle or series of vehicles that may drive along the path and/or a similar path. At times, these reference trajectories may vary due to path conditions (e.g., traffic flow, weather, etc.).

The path, including any deviations thereof may be represented by the set of variables R. Because of the spatial component of R, each path will be unique for each driving path or roadway. However, a particular location may correspond to multiple paths (R) due to different maneuvers (e.g., turning left, decelerating, turning right) starting or ending at or near the particular location.

A path may be represented through many mechanisms. One representation is a set of spatial points, each one associated with a set of parameters describing the variation of different variables associated with a particular spatial point. A second representation of a path includes a set of curves representing the path and another set of curves representing, for example, a standard of deviation from the path. For example, if standard curve for a path is represented by speed as a function of distance along the path, the standard of deviation for the path may include distribution curves for a speed of the 75th and 25th percentile of vehicles along that same path, as is shown in FIG. 3A. This set of curves may also be used in combination with other curves, such as a spatial curve in an X-Y format from which distances and other spatial relationships for the path can be derived.

Another way in which a path may be generated is by comparing features of the data (e.g., position, variables, maneuvers, etc.) to one another For example, a maximum yaw rate for a yaw maneuver may be associated with a certain geographic point (latitude and longitude) along the path. The beginning of the yaw maneuver may be parameterized as a distance before the maximum yaw rate geographic point and the end of the maneuver as a distance after maximum yaw rate. Similarly, deviations from a path constructed in this way may be characterized as the earliest onset of yaw measured as a distance from the standard maximum, or potentially from the standard starting onset of yaw location.

In some embodiments, the road model may describe one or more paths in terms of how they are driven by a plurality of vehicles. Often times, the road model includes spatial components that define the geometry and/or cartography of the paths and behavioral components that describe vehicle and/or driver behavior (speed, acceleration, etc.) when driving the plurality of roadways. In some embodiments, the road model may incorporate some, or all, of the variables to describe a multidimensional space associated with the path. In some instances, additional data (e.g., GPS coordinate data or information from a state or local transportation agency) may also be used to build or augment the road model.

In some instances, the road model may be generated using various statistical analyses of the data received at step 205 and/or the variables identified at step 220 to develop a standard or average representation of a path. The path may be built as a multidimensional space consisting of potentially all of the kinematic variables, but minimal spatial components describing a geometric path and often a temporal component describing vehicle speeds. In addition to a path, a road model may include indications of a typical range of vehicle behaviors when driving the path.

One way of generating a path for a road model includes a cross path deviation that may be represented by the variance or standard deviation of the variables for all of the vehicles along a particular path as is shown in FIGS. 3A, 3C, 3F, 3H, and 3J, discussed below. Deviations may also be represented by complicated distribution functions, such as bimodal or Poisson distributions, histograms, numerical tables, and/or by adjacent paths describing the, for example, the $90^{th}$ percentile spatial envelope.

In some embodiments, a road model of a path may include additional information about the path. Examples include average speed and the distribution of speeds and/or acceleration events at a position along the path. A path derived by the method above may vary depending on weather conditions, time of day, traffic or other factors. These other factors, if utilized, or captured may be associated with the various paths representing a particular driving path.

In some embodiments, execution of a machine learning process with the received driving data, categorized data, and identified/determined variables may be used to build the road model by way of an iterative process. In later iterations or stages of the road building process, a supervised learning algorithm, such as a Neural Net or a Random Forest (again described in Hastie and other sources) may be used to build or refine a road model.

In one instance, building a road model may include conducting multivariate analysis via which various parameters may be evaluated to determine the set of variables that leads to a minimum cost function for use in building the road model. These parameters may then be used as indices for the road model, driver model, or vehicle model of which the driver and vehicle models will be discussed in greater detail below.

In some embodiments, execution of process 200 including preprocessing, categorization, maneuver definition, and multivariate analysis that may be performed iteratively in order to arrive at the optimum set of indices for a particular path based on their ability to predict, for example, vehicle speeds, vehicle accelerations vehicle positions and sensor returns. In these instances, multivariate analysis via which various parameters may be evaluated to determine the set of variables that leads to a minimum cost function for use in building the road model may be used. These parameters may then be used as indices for the road model, driver model, or vehicle model of which the driver and vehicle models will be discussed in greater detail below. At times, the cost function may be determined based on the parameters for the road model. For example, in an embodiment where a prediction of a speed of a vehicle is being made, the cost parameter used by the supervised learning algorithm may be related to the difference between the predicted speed and the actual speed for a given vehicle. In this example, the total root mean square error of the speed for all vehicles over a given maneuver or set of maneuvers is the cost function.

An exemplary road model for a path A and a path B are depicted in FIGS. 3E-3H. FIG. 3E depicts the raw driving data for the speed and direction of vehicles as they travel along path A 331B as well as the average speed and direction of the vehicles as the travel along path A 332A. FIG. 3F depicts a road model 332A constructed using the average speed and direction of the vehicles as the travel along path A as applied to the geometrical information for path A.

Path 2 is a curved path and FIG. 3G depicts the raw driving data for the speed and direction of vehicles as they travel along path B 331D as well as the average speed and direction of the vehicles as the travel along path B 332C. FIG. 3H depicts a road model 332C constructed using the average speed and direction of the vehicles as the travel along path B as applied to the geometrical information for path B.

Figure 3I:
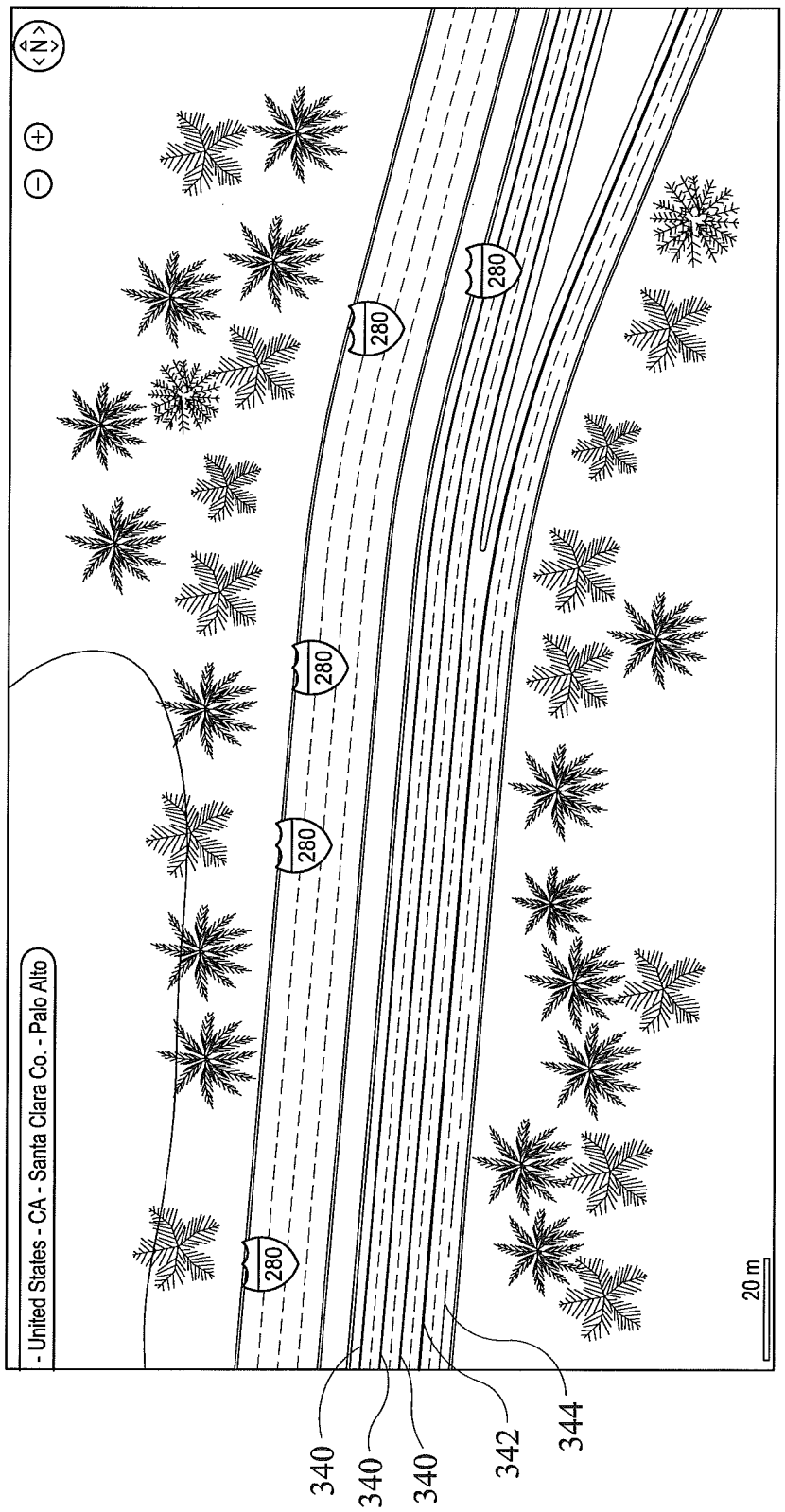

Another exemplary road model 305 is provided by FIG. 3I in which an average speed and direction of travel for vehicles along each of three lanes of a path is depicted 340. An average speed and direction of travel for vehicles as they exit the path via an exit ramp 342 is also depicted. In addition, an average speed and direction of travel for vehicles as they exit the path via an unauthorized lane or road shoulder 344 is also depicted. The unauthorized lane or road shoulder traffic 344 would not appear on traditional maps of the path, as it is not considered a proper roadway.

Optionally, process 200 may proceed to step 235 in which predictions of how a path may be driven may be made based upon the road model. For example, when the road model includes time dependent data, predictions with regard to the beginning and ending of periods when a large number of vehicles will be traveling along the path (i.e., rush hour) may be made. Additionally, predictions of how vehicles will drive along the path (e.g., speed, number of lane changes, etc.) may also be made based upon the road model.

FIG. 3J depicts an exemplary road model 306 that includes predictions of a likelihood of a conflict between vehicles driving along two intersecting paths 350 and 360. Path 350 is a straight line representing a highway and path 360 is a curved line representing an on ramp for the highway. Region 355 indicates an area with the greatest changes in speed for vehicles traveling along path 350 and region 365 indicates an area with the greatest changes in speed for vehicles traveling along path 360. The road model incorporating these two paths may include predictions as to regions of conflict for vehicles traveling along paths 350 and 360. For example, the road model may predict a greater likelihood of conflict between vehicles traveling along paths 350 and 360 where regions 355 and 365 overlap.

In some instances, road models for different roads may be used to determine an amount of behavioral similarity between the roads at different locations. This process may also allow for extrapolation or interpolation of various behavioral variables when geometric variables are similar and/or make predictions regarding how vehicles may drive a path in the future (step 230). For example, execution of step 230 may include predicting vehicle trajectory when traveling along a path, where a vehicle will begin to exit a path make a turn, or slow down when approaching a stop sign.

In some embodiments, the road model may include information regarding the operation of the vehicles, other than the way the path is traveled along by the vehicles. For example, when the received driving information of step 205 includes an indication of when and where a vehicle's windshield wipers or turn indicators are activated, this information may also be included in the road model and/or subsequently generated driver model and/or vehicle model, as discussed below with regard to steps 235-260.

In one embodiment, received driving data from one or more drivers who are the subject(s) of the driver model may be processed to determine one or more characteristics of the driver(s) (step 235). In some instances, the processing of step 235 may include segmenting or otherwise parsing out information about a particular driver or drivers from the information received at step 205 so that it may be processed to determine the characteristics and/or preferences of the driver(s). In some circumstances, driver information and/or characteristics may be received from a third-party (e.g., an auto insurance company) or directly from the driver. These characteristics may then be compared to the road model (step 240) and the driver model may be built based upon these comparisons (245).

In some instances, a risk score may be calculated and/or assigned to the driver responsively to the comparison(s). The risk score may be used to, for example, provide performance feedback to the driver and/or a supervisor of the driver (e.g., employer or parent. Exemplary uses of the risk score are for driver education and/or training purposes. The risk score may be provided to the driver and/or supervisor via, for example, in-vehicle indications (warning lights or sounds), sending an electronic message to the driver (e.g., via SMS text message or email) and/or through the setting of insurance rates based on the risk score.

In embodiments where multiple road models are generated or otherwise available, a particular road model may be selected for use in the building of a driver model based on, for example, driver, vehicle, or path characteristics. A driver model may describe an individual vehicle's deviation from the path of the road model in any of multiple dimensions when driven by a particular driver. These deviations may be represented as a set of parameters collectively identified as W.

The parameters collectively identified as W may be defined in terms of, for example, distance, time, speed, velocity, acceleration rate, deceleration rate or a combination thereof. These parameters may be measured relative to, for example, absolute locations or any other identifiable feature in the path description provided by the road model. At times, the parameters collectively identified as W may be wholly or partially dependent upon factors external to the characteristics of a particular driver, such as vehicle type, vehicle condition, weather conditions, time of day, time of year, etc.

Refereeing to these deviations as W offers a concise description of driver style and may be used, in some instances, to determine a skill level for a driver, a likelihood that the driver will be involved in a driving accident, a likelihood of the driver causing damage to a vehicle by driving it in a manner inconsistent with its intended modes of operation, etc. This description may be of interest to, for example, insurance companies, driver-licensing authorities, and hiring managers for commercial drivers, and driving instructors.

W may also be used by the vehicle industry to establish certain driving parameters appropriate for a given driver and may perform an action when an inappropriate parameter presents itself (see description of step 430 and 445, provided below).

W may further be used to guide the operation of autonomous, semi-autonomous and driver assistance systems (in conjunction with, for example, real-time sensor data) to determine when to intervene or the target behaviors the vehicle seeks to adjust and/or emulate. W can provide an indication of times when a driver is outside their comfort zone and intervention is appropriate, even though for many other drivers with different values of W intervention may not be appropriate. Autonomous systems often drive in a manner that is not comfortable for passengers or may not be a style that a particular passenger enjoys. Using the passenger's W in the autonomous control systems will provide a driving style more pleasing and comfortable to the passenger.

In another embodiment, W may also be used in electronic simulations of driving systems to ensure that the vehicle responds in a manner consistent with expected driver behaviors. W may also be used in traffic simulations to provide greater fidelity for the movements of individual vehicles and populations of vehicles when operating the simulation.

The possible parameters associated with W may also be extensive and include features occurring along a path that may influence driving behavior. Such features may be inherent to a road network along the path, such as stop signs, traffic lights, lane dividing lines, reduced speed zones, etc., or may be external to the road network, such as billboards, sightlines, views, and distractions. In some instances, the features may be present in the behavioral data but unrelated to any physically identifiable cause. In this way, if the location where a particular behavior occurs can be identified in the behavioral database, behaviors can be referenced to that feature, even if the behavior has no corresponding physical cause.

Examples of other parameters that may be included within W include the point at which a driver begins to decelerate for a path feature (curve, stop sign, speed limit change, etc.), where the driver accelerates for a path feature, where the driver begins to turn for a path feature (e.g. for a right turn, shift to the right of the path), how fast the driver typically accelerates or decelerates and the variance thereof, preferred rates of lateral acceleration, and maximum tilt angles. These parameters may be determined in relation to in absolute terms (e.g., latitude and longitude), particular path features (e.g., a distance between two path features and a time it takes for the driver to travel the distance), population (at the 3 $\sigma$ point)

depending on, for example, which reference is most appropriate for the driver and variable. W may include parameters describing any of the behavioral variables, possibly under different conditions (e.g., traffic flow or weather) of roadway.

At times, W may also include deviations included within the path. For example, W may contain a parameter S that describes the characteristic speed of the driver with respect to the standard speed. S may be in absolute units, such as miles per hour, or in standard deviations (e.g. +1.5 σ), or some combination thereof. Thus, if S equals 5 mph+1.5 σ, a driver would be expected to drive at a speed 1.5 σ above the standard speed (σ being obtained from the standard speed distribution)+5 mph.

In some instances, the parameters of W may be derived from a best-fit comparison of the individual driver's observed driving to that of a reference population of drivers. For an individual driver, the relevant parameters may be selected from a larger set of parameters as appropriate to meet a desired accuracy threshold.

To further illustrate the generation of the driver model, consider the following example of a driver model wherein for a particular driver and appropriate road model, the set of driver parameters, W, for the driver model includes the following information: The driver typically drives at the +1.3 σ speed, but begins deceleration maneuvers for turns at a point 0.3 σ-20 m from the statistically average location for beginning the deceleration maneuvers as indicated by the road model until the driver reaches a speed 5 MPH above the statistical average for that location. The driver slows for stop signs at an average deceleration rate 0.2 σ above average.

Driver models may also be used to detect changes in an individual's driving behaviors. This can be done either by recording changes to the components of W that are outside the normal variation for drivers, or for a particular driver. With sufficient data, the driver of interest may also implement this process where the reference population is only trips. This process is particularly valuable for detecting impairment or for determining a change in insurance risk for the driver at issue.

In step 250, received driving data from one or more vehicles that are the subject(s) of a vehicle model may be processed to determine one or more characteristics of the vehicle(s). In some instances, execution of steps 210, 215, and/or 220 may include segmenting or otherwise parsing out information about a particular vehicle or vehicle type from the information received at step 205 so that it may be processed to determine the characteristics of the vehicle or type of vehicle. In some circumstances, vehicle and/or characteristics may be received from a third-party (e.g., a vehicle manufacturer more mechanic) or from the driver of the vehicle. These characteristics may then be compared to the road model (step 255) in a manner similar to that of the comparison of step 240 and the vehicle model may be built based upon these comparisons (260).

In some instances, a risk score may be calculated and/or assigned to the vehicle responsively to the comparison(s). The risk score may be used to, for example, provide performance feedback to the driver and/or a vehicle supervisor or manufacturer. Exemplary uses of the risk score are for driver education, vehicle evaluation, and/or training purposes. The risk score may be provided to the driver vehicle supervisor, and/or vehicle manufacturer via, for example, in-vehicle indications (warning lights or sounds), sending an electronic message to the driver (e.g., via SMS text message or email) and/or through the setting of insurance rates based on the risk score.

Figure 4:
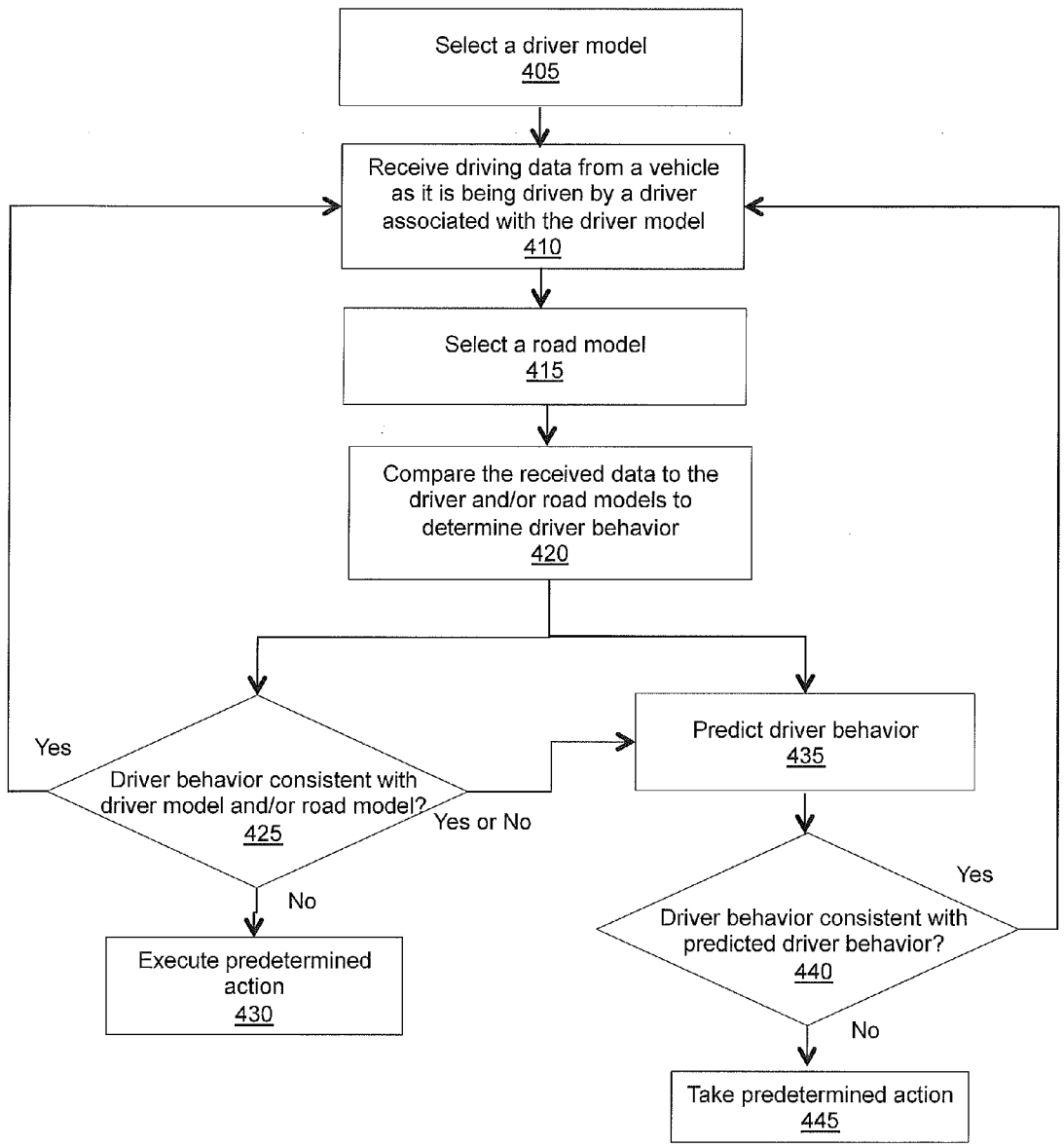
FIG. 4 is a flowchart illustrating an exemplary process for determining whether driver behavior is consistent with a driver model and/or road model consistent with embodiments of the present invention.

FIG. 4 depicts a process 400 for determining whether a driver's behavior is consistent with a driver model and/or a road model. Process 400 may also be executed to determine predictions of a driver's behavior. Process 400 may be executed by, for example, any of the systems and/or system components discussed herein.

Initially, a driver model may be accessed (step 405). The driver model may be accessed by, for example, model generation device 120 by querying road/driver/vehicle model storage device 130 with, for example, one or more characteristics of the driver or the path along which the driver is driving. The driver model may be generated via execution of process 200. In some instances, the driver model accessed in step 405 may be selected from a plurality of previously generated driver models based on, for example, a characteristic of the driver, a driver preference, an environmental condition, a characteristic of the path, and/or some combination thereof. In this way, driver models may be selected from other driver models supplied by other peer drivers (i.e., drivers who share one or more characteristics (e.g., behavioral or demographic) with the driver of the vehicle) as well as, or instead of, a driver model associated with the vehicle driver. In this way, selection of a driver model to apply to process 400 may be personalized.

In some instances, personalization of the selection of step 405 may include selecting, by the driver, a particular type of driver model to apply to process 400. Exemplary types of driver models include cautious, sporty, standard, smooth, etc. and each of these types may be defined by one or more preferences for how the vehicle should be driven. For example, if the selected type is "sporty" then the vehicle may be driven with greater acceleration rates and shorter stopping distances than when the selected type is "cautious."

Exemplary types of driver models may also incorporate preferences for driving in certain environmental conditions (e.g., rain, fog, or darkness), traffic conditions (e.g., freely flowing traffic vs. stop and go traffic), and/or path types (e.g., preferred stopping distance for highway driving vs. city driving).

Driving data from a vehicle, such as vehicle 110a-110n and/or a sensor, such as sensor 115a-115n, may then be received (step 410). The driving data may be received as the vehicle is being driven and/or after the vehicle has been driven. The accessed driver model may be associated with, for example, a particular individual or machine driving the vehicle, a group of drivers, and/or drivers associated with a particular path along which the vehicle is traveling. At times, the accessed driver model may change as a driver travels along a path. In some instances, the driver model accessed may be responsive to the accessed road model.

In some instances, the accessed road model may be selected from a set of road models based on one or more characteristics of the path being driven by the driver when, for example, a road model for the driven path is not available. In this way, the accessed road model may be associated with a roadway that is a peer of the path being driven or road model that shares one or more characteristics with the path.

In some instances, the road model accessed in step 415 may be selected from a plurality of previously generated road models based on, for example, a characteristic of the driver, a driver preference, an environmental condition, a characteristic of the path, and/or some combination thereof. In this way, road models may be selected from other road models supplied by other peer drivers/vehicles. In this way, selection of a road model to apply to process 400 may be personalized.

In some instances, personalization of the selection of step 455 may include selecting, by the driver, a particular type of road model to apply to process 400. Exemplary types of road models include information regarding how vehicles drive along a path according to driving type (e.g., cautious, sporty, standard, smooth, etc.) and each of these types of road models may be defined by one or more characteristics of how the path is driven by different types of drivers. For example, if the selected type of road model is "sporty" then the path may be driven with greater acceleration rates and shorter stopping distances than when the selected type is "cautious."

Exemplary types of road models may also incorporate preferences for driving types of paths in certain environmental conditions (e.g., rain, fog, or darkness), traffic conditions (e.g., freely flowing traffic vs. stop and go traffic), and/or path types (e.g., preferred stopping distance for highway driving vs. city driving).

Optionally, the accessed road model and/or driver model may change as a vehicle travels along a path. For example, if a vehicle driving along a path encounters road construction, the road model for the path may be either changed to reflect the road construction or a new road model that incorporates the road construction either generally or along the path specifically may be accessed. In this way, the road and/or driver model may by dynamically selected according to one or more conditions present along the path or with the vehicle or driver. In another example, a driver model consistent with the driver traveling along a straight path may be dynamically changed to a driver model consistent with the driver traveling along a curved path responsively to a prediction and/or receiving an indication that the driver is approaching a curved highway exit path.

Optionally, the received data may be compared to the driver and/or road models in order to determine driver behavior (step 420). In some instances, the results of this comparison may be used to, for example, determine whether the proper driver and/or road model has been accessed and/or whether the driver and/or road model is consistent with the received driving data. The accessed road and/or driver model(s) may then be, for example, validated, modified, and/or updated based on the comparison. In some circumstances, the accessed road and/or driver model(s) may be changed (i.e., another road and/or driver model(s) may be selected) and/or use of the accessed road and/or driver model(s) may be discontinued responsively to the comparison.

In other instances, the comparison of step 420 may be used to determine if the driver behavior is consistent with the road and/or driver model (step 425). The determination of step 425 may be subject to many factors and tolerances for outlying information. However, in most cases, determining whether driver behavior is consistent with the road and/or driver model will involve determining whether the current driver behavior is different from the road and/or driver model in a statistically significant way.

When driver behavior is consistent with the road model and/or driver model, driving data may continue to be received from the vehicle (step 410) or process 400 may end. When driver behavior is not consistent with the road model and/or driver model, a predetermined action may be executed (step 430). The action to be executed may be predetermined by, for example, an administrator of process 400, a driver, a vehicle manufacturer, an insurance company, and/or a law enforcement entity. In some instances, the predetermined action executed may be responsive to the determined behavior, a type of inconsistency between driver behaviors and the road model and/or driver model, and degree of severity of the inconsistency. Exemplary actions include a warning, transmission of a message to the driver, alerting a law enforcement agency, or adjusting the manner in which the vehicle is driven (e.g., slow down, change direction, or speed up).

Additionally, or alternatively, a prediction of driver behavior may be made (step 435). At times, the prediction may be responsive to, for example, the comparison of step 420 and/or the determination of step 425. Exemplary predictions of driver behavior include when the driver will begin to slow down in order to execute a maneuver (i.e., exit a highway or approach a traffic light), how fast a driver may accelerate in order to execute the maneuver (i.e., merge into oncoming traffic or initiate movement when stopped).

When driver behavior is consistent with the predicted driver behavior, driving data may continue to be received from the vehicle (step 410) or process 400 may end. When driver behavior is not consistent with the road model and/or driver model, a predetermined action may be executed (step 430). The action to be executed may be predetermined by, for example, an administrator of process 400, a driver, a vehicle manufacturer, an insurance company, and/or a law enforcement entity. In some instances, the predetermined action executed may be responsive to the determined behavior, a type of inconsistency between driver behaviors and the road model and/or driver model, and degree of severity of the inconsistency. Exemplary actions include a warning, transmission of a message to the driver, alerting a law enforcement entity, or adjusting the manner in which the vehicle is driven (e.g., slow down or speed up).

Figure 5:
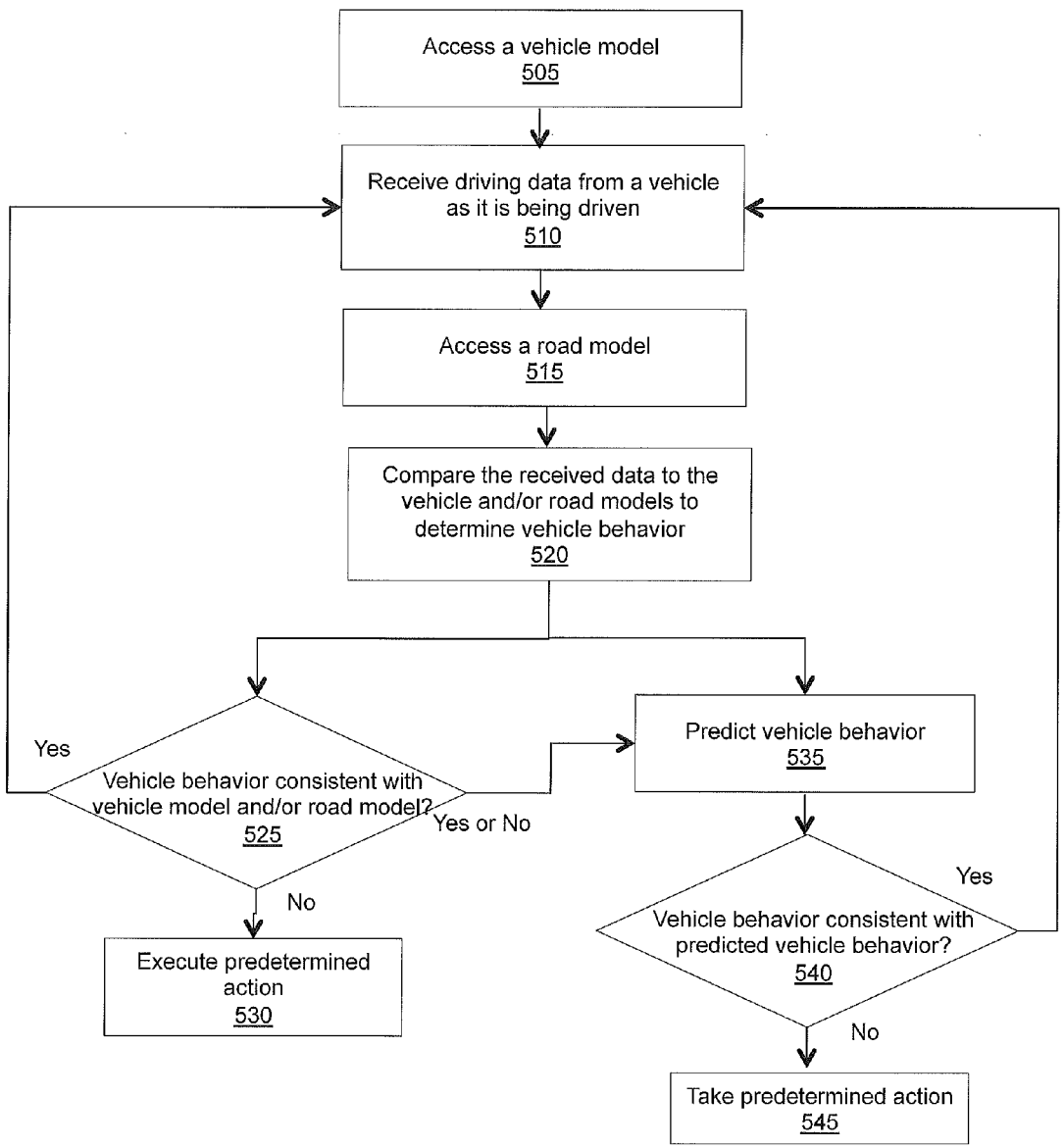
FIG. 5 is a flowchart illustrating an exemplary process for determining whether vehicle behavior is consistent with a vehicle model and/or road model consistent with embodiments of the present invention.

FIG. 5 depicts a process 500 for determining whether a vehicle's behavior is consistent with a vehicle model and/or a road model. Process 500 may also be executed to determine predictions of a vehicle's behavior. Process 500 may be executed by, for example, any of the systems and/or system components discussed herein.

Initially, a vehicle model may be accessed (step 505). The vehicle model may be accessed by, for example, model generation device 120 by querying road/driver/vehicle model storage device 130 with, for example, one or more characteristics of the vehicle or the path along which the vehicle is driving. In some instances, the vehicle model accessed in step 505 may be selected from a plurality of previously generated driver models based on, for example, a characteristic of the vehicle (e.g., year, make, and/or model), vehicle performance limits, a driver preference, an environmental condition, a characteristic of the path, and/or some combination thereof. In this way, vehicle models may be selected from other vehicle models supplied by other peer vehicles (i.e., vehicles who share one or more characteristics (e.g., behavioral or demographic) with the vehicle) as well as, or instead of, a vehicle model associated with the particular vehicle being driven. In this way, selection of a vehicle model to apply to process 500 may be personalized.

In some instances, personalization of the selection of step 505 may include selecting, by the driver, a particular type of vehicle model to apply to process 500. Exemplary types of vehicle models include driving the car in a cautious, sporty, standard, smooth, etc. manner and each of these types may be defined by one or more preferences for how the vehicle should be driven. For example, if the selected type is "sporty" then the vehicle may be driven with greater acceleration rates and shorter stopping distances than when the selected type is "cautious."

Exemplary types of vehicle models may also incorporate preferences for driving in certain environmental conditions (e.g., rain, fog, or darkness), traffic conditions (e.g., freely flowing traffic vs. stop and go traffic), and/or path types (e.g., preferred stopping distance for highway driving vs. city driving).

The vehicle model may be generated via execution of process 200. Driving data from a vehicle, such as vehicle 110a-

110*n* and/or a sensor, such as sensor 115*a*-115*n*, may then be received (step 510). The driving data may be received as the vehicle is being driven and/or after the vehicle has been driven.

The accessed vehicle model may be associated with, for example, a particular individual or machine driving the vehicle, a group of vehicles, and/or vehicles associated with a particular path along which the vehicle is traveling. At times, the accessed vehicle model may change as a vehicle travels along a path. In some instances, the vehicle model accessed may be responsive to the accessed road model.

In some instances, the accessed road model (step 515) may be selected from a set of road models based on one or more characteristics of the path being driven by the vehicle when, for example, a road model for the driven path is not available. In this way, the accessed road model may be associated with a roadway that is a peer of the path being driven or road model that shares one or more characteristics with the path.

In some embodiments, the road model accessed in step 515 may be selected from a plurality of previously generated road models based on, for example, a characteristic of the vehicle, a driver preference, an environmental condition, a characteristic of the path, and/or some combination thereof. In this way, road models may be selected from other road models supplied by other peer drivers/vehicles. In this way, selection of a road model to apply to process 500 may be personalized.

In some instances, personalization of the selection of step 515 may include selecting, by the driver, a particular type of road model to apply to process 500. Exemplary types of road models include information regarding how vehicles drive along a path according to driving type (e.g., cautious, sporty, standard, smooth, etc.) and each of these types of road models may be defined by one or more characteristics of how the path is driven by different types of drivers. For example, if the selected type of road model is "sporty" then the path may be driven with greater acceleration rates and shorter stopping distances than when the selected type is "cautious."

Exemplary types of road models may also incorporate preferences for driving types of paths in certain environmental conditions (e.g., rain, fog, or darkness), traffic conditions (e.g., freely flowing traffic vs. stop and go traffic), and/or path types (e.g., preferred stopping distance for highway driving vs. city driving).

Optionally, the accessed road model and/or vehicle model may change as a vehicle travels along a path. For example, if a vehicle driving along a path encounters road construction, the road model for the path may be either changed to reflect the road construction or a new road model that incorporates the road construction either generally or along the path specifically may be accessed. In this way, the road and/or vehicle model may by dynamically selected according to one or more conditions present along the path or with the vehicle or driver. In another example, a vehicle model consistent with the vehicle traveling along a straight path may be dynamically changed to a vehicle model consistent with the vehicle traveling along a curved path responsively to a prediction and/or receiving an indication that the vehicle is approaching a curved highway exit path.

Optionally, the received data may be compared to the vehicle and/or road models in order to determine vehicle behavior (step 520). In some instances, the results of this comparison may be used to, for example, determine whether the proper vehicle and/or road model has been accessed and/or whether the vehicle and/or road model is consistent with the received driving data. The accessed road and/or vehicle model(s) may then be, for example, validated, modified, and/or updated based on the comparison. In some circumstances, the accessed road and/or vehicle model(s) may be changed (i.e., another road and/or vehicle model(s) may be selected) and/or use of the accessed road and/or driver model(s) may be discontinued responsively to the comparison.

In other instances, the comparison of step 520 may be used to determine whether the vehicle behavior is consistent with the road and/or vehicle model (step 525). The determination of step 525 may be subject to many factors and tolerances for outlying information. However, in most cases, determining whether vehicle behavior is consistent with the road and/or vehicle model will involve determining whether the current vehicle behavior is different from the road and/or vehicle model in a statistically significant way.

When vehicle behavior is consistent with the road model and/or vehicle model, driving data may continue to be received from the vehicle (step 510) or process 500 may end. When vehicle behavior is not consistent with the road model and/or vehicle model, a predetermined action may be executed (step 530). The action to be executed may be predetermined by, for example, an administrator of process 500, a driver, a vehicle manufacturer, an insurance company, and/or a law enforcement entity. In some instances, the predetermined action executed may be responsive to the determined behavior, a type of inconsistency between vehicle behaviors and the road model and/or vehicle model, and degree of severity of the inconsistency. Exemplary actions include a warning, transmission of a message to the driver or vehicle, alerting a law enforcement agency, or adjusting the manner in which the vehicle is driven (e.g., slow down, change direction, or speed up).

Additionally, or alternatively, a prediction of vehicle behavior may be made (step 535). At times, the prediction may be responsive to, for example, the comparison of step 520 and/or the determination of step 525. Exemplary predictions of vehicle behavior include when the vehicle will begin to slow down in order to execute a maneuver (i.e., exit a highway or approach a traffic light), how fast a vehicle may accelerate in order to execute the maneuver (i.e., merge into oncoming traffic or initiate movement when stopped).

When vehicle behavior is consistent with the predicted vehicle behavior, driving data may continue to be received from the vehicle (step 510) or process 500 may end. When vehicle behavior is not consistent with the road model and/or vehicle model, a predetermined action may be executed (step 530). The action to be executed may be predetermined by, for example, an administrator of process 500, a driver, a vehicle manufacturer, an insurance company, and/or a law enforcement entity. In some instances, the predetermined action executed may be responsive to the determined behavior, a type of inconsistency between vehicle behaviors and the road model and/or vehicle model, and degree of severity of the inconsistency. Exemplary actions include a warning, transmission of a message to the driver and/or vehicle, alerting a law enforcement entity, or adjusting the manner in which the vehicle is driven (e.g., slow down or speed up).

Using the foregoing described systems and processes; the following applications of the present invention may be implemented.

The standard behavioral description of a roadway or path, R, may be used to characterize roads or paths based on their ability to be driven or the amount of attention required by a driver to safely drive the path. For instance, in a traditional driving scenario, a drivers looking at a path ahead typically forms an assessment of how they will drive along the path (e.g., speed, direction, etc.). Most drivers, when looking at the same section of road, and under similar circumstances, drive the path in a similar way (e.g., similar speed and direction). To the extent that they choose dissimilar speeds, the path may be open to interpretation as to the best speed, and may require more thought on the part of the driver who has to determine the proper speed for driving the path.

The variance in the speed measurements on a road or path, as included in the roadway description R, or some other measure of the range of speeds chosen, such as the Inter Quartile Range, may also serve as a measure of the ease of assessing speed, or the driver workload associated with the path in question. This measurement may be used as a proxy for workload, which may be used to modulate other communications or distractions to the driver, such as inputs from driver assistance systems or communications systems.

When geometric variables (typically not location) present in a road model, are similar, differences in behavioral variables may represent differences in the driving styles of the population and may serve indicate different road treatments, such as speed limits or traffic controls, imposed by a road management authority are needed. In addition, path locations within a road model with higher variance in certain behavioral variables, such as speed, may indicate more difficult sections of road that may deserve attention from and/or adjustment by a department of transportation or other road authority. Other behavioral variables, such as lateral deviations, may indicate potholes or other road surface features needing repair.

In some embodiments, road driver and/or vehicle models for a particular path may be compared with one another in order to, for example, determine a degree of variance therebetween. This degree of variance may then be used to determine how difficult a path is to drive and/or how much driver attention is required in order to drive the path safely. In some instances, this analysis may be based on a particular peer group of drivers and/or vehicles (e.g., drivers/vehicles that have or have not driven along the path before). These determinations may be relative to the path itself, the vehicle model, and/or the driver model. For example, when the path relates to a section of roadway that includes a curve on an incline, road, driver and/or vehicle models drivers associated with traveling along the path may be used to determine an optimum speed and/or radius of curvature for traveling along the path. In some instances, this analysis may be performed relative to other peer (i.e., similar) paths, drivers, and/or vehicles. Thus, an optimum speed for the path may be determined relative to a particular driver and/or vehicle or peer group of drivers and/or vehicles. For example, if vehicles of a first type (e.g., a truck) tend to travel along the speed at 30 miles per hour, then the vehicle model for the path would indicate the optimum speed for peer vehicles (other similar trucks) for the path is 30 miles per hour.

Behavioral variables in R may also be correlated to safety or fuel economy and may be used in improving the infrastructure to improve safety and fuel economy. To the extent that the variables in R impact fuel economy, safety, time, distance or any other driving cost they may be used in routing functions to minimize such costs.

W and R (either separately or together) may be used in electronic simulations of driving systems to ensure that the vehicle responds in a manner consistent with expected driver behaviors. They may also be used in traffic simulations to provide greater fidelity for the movements of individual vehicles and populations of vehicles.

The road, driver, and/or vehicle models described herein may also be used to determine whether the driving situation along a path is 'normal' or if there are extenuating circumstances present. Since the baseline behavior of a path is a statistical description of 'normal' for that path, the presence of a population of vehicles with behavior deviating from the normal statistics indicates an abnormal situation. Autonomous or semi-autonomous systems within a vehicle may then be configured respond to such abnormal situations with appropriate behaviors, such as disabling cruise control or auto-driving assistance procedures. For example, if the baseline data indicates that the negative 3-sigma speed for a path is 30 MPH and a vehicle receives input from several vehicles ahead that they are travelling at 20 MPH, a conclusion may be reached that conditions are not normal. In this situation, the baseline road, driver, and/or vehicle model may be modified to correspond with one consistent with 20 MPH speeds, say an icy road surface model, or a system may choose to disengage and not provide speed recommendations or controls to a driver.

When this invention is used in conjunction with automated and semi-automated driving systems, road models can provide targets for various automated processes. Exemplary targets include vehicle speed, lateral position within the lane, acceleration, and deceleration. These targets may be designed to be appropriate for the conditions (e.g., weather, light glare, vehicle weight, etc.), driving style of the driver (aggressive, non-aggressive), and/or an individual preference, as may be the case when the vehicle behavior is matched to a driver's behavior (W).

Road models may be used to determine when it is appropriate to enable automation of a driving experience (e.g., only regions where there are no traffic signals or intersections). Road models may also be used to provide an indication of when there is anomalous behavior on a road, and thereby provide an indication of when it may be appropriate to disengage automated functionality.

In some instances, the present invention may provide in Intersection Movement Assistance (IMA). A typical problem with intersection movement (as may occur at, for example, a four-way stop sign) is deciding which vehicle goes next through an intersection. This is often "negotiated" between vehicles contesting the intersection by slight movements of the vehicles, often in conjunction with hand motions, blinkers, or other signals. The present invention may be used to monitor the fine movements (e.g., vehicle movement of a foot or less) of vehicles, as well as other signals, at an intersection to gain an understanding of the various signals sent by vehicles on each of the various intersection approaches. This understanding may be used to automate the signals provided by a particular vehicle and aid in the interpretation of signals from other vehicles for the driver of the vehicle.

The present invention may also be used to set headways for Automatic Cruise Control (ACC). Headway may be understood as the time or distance between a driving vehicle and the vehicle in front of it. The present invention may be used to monitor the speed of the vehicle in front of the driving vehicle so that an appropriate distance is maintained when the car is driving with the assistance of cruise control. The cruise control speed may also be adjusted in accordance with the road, driver, and/or vehicle model based on, for example, road conditions, driver preferences, terrain and/or environmental conditions.

In some examples, the peer-based assessments described herein may apply to the peers of a particular vehicle implementing this technology, but also to the peers of any targets (e.g., other vehicles traveling along the path, entering or exiting the path) observed by the vehicle. For example, a vehicle may have sensors, such as a radar or vision system, that allows it to observe another vehicle on a merging trajectory leading to a potential conflict. The observing vehicle may be configured to assess characteristics of the target vehicle to determine a set of appropriate peers for that vehicle. Characteristics of the peer group of the target vehicle may then be used to predict the movement and hence the probabilities of conflict (based perhaps on expected speed and acceleration) between the observing vehicle and the target vehicle. This information may then be used to plan trajectories for the observing vehicle so as to avoid a conflict or achieve other objectives.

Targets of observing vehicles may also include non-vehicles, such as pedestrians, livestock, or even inanimate objects such as a soccer ball. As an example of this embodiment, the target may be a pedestrian standing on the side of the road, one goal of the system is then to determine if this pedestrian is likely to move in front of the vehicle or not. The peer group may include all pedestrians standing on the side of the road, but more discrimination may be available from using the peer group of people standing on the side of the road and facing towards the road, and possibly that group facing towards the road but looking away from the oncoming vehicle. This embodiment allows for calculation of quantitative probabilities regarding whether the pedestrian will move in front of the vehicle. To the extent that any of these objects, cars, trucks, motorcycles, pedestrians, livestock, or soccer balls have movement patterns that can be inferred from this approach, and these objects can be identified remotely, there movement patterns can be predicted by the system identifying those objects as described above.

Figure 6:
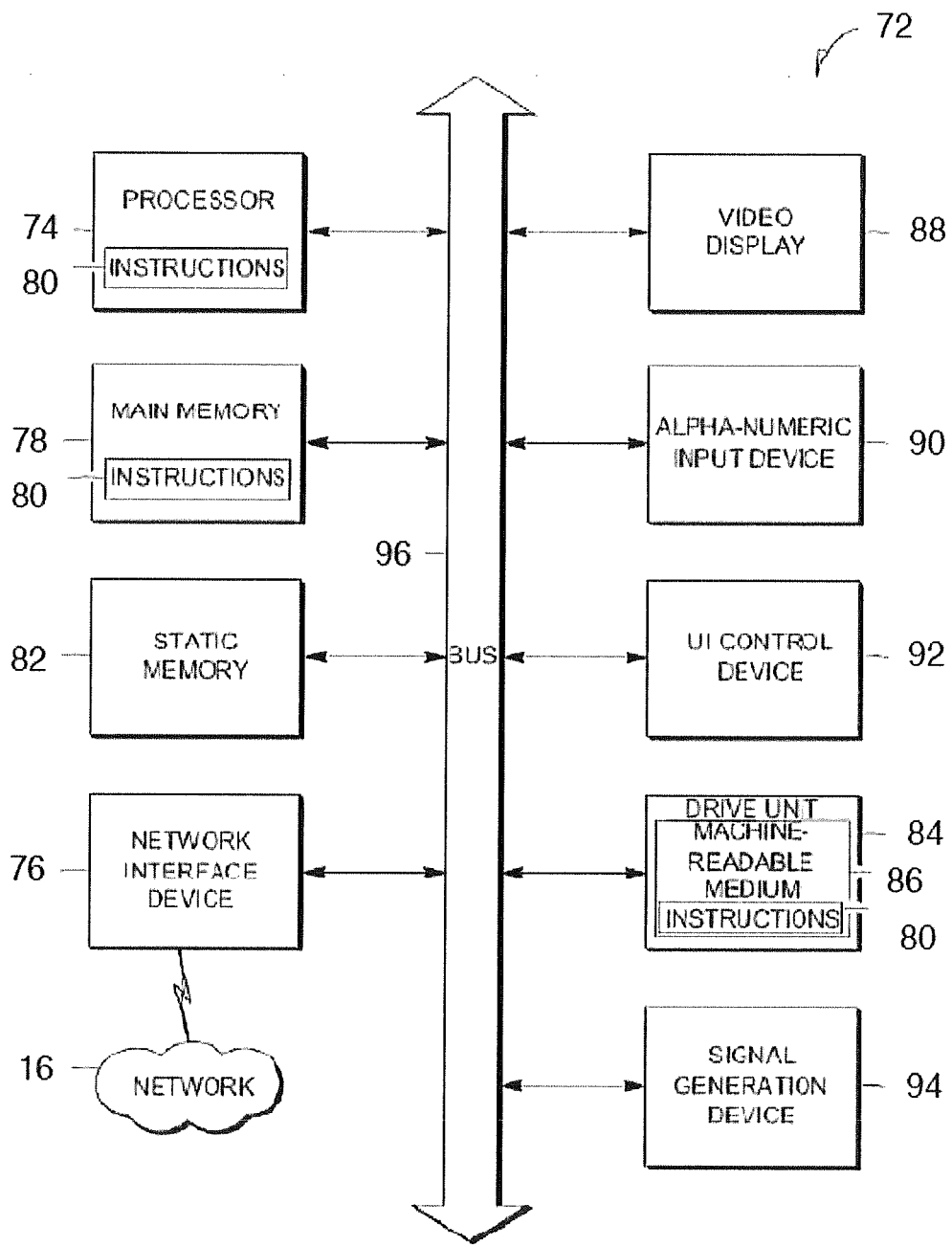
FIG. 6 illustrates an example of a computer system in which embodiments of the invention may be instantiated.

As evident from the foregoing discussion, one or more of the methods or processes described herein may be executable on various computer-based devices (e.g., clients 14a-14n and/or server 12). Such devices, an example (72) of which is illustrated in FIG. 6, may include any electronic device capable of performing the actions described above (using suitable programming) and, where applicable, processing the information for display so as to properly convey the information. Examples of such devices include desktop computers, laptop computers, cellphones, smart phones, tablet computers, computer game consoles, portable computer gaming consoles, media players, portable media players, other mobile devices, and the like.

In such devices, a processor 74 may control the overall functions of the electronic device such as running applications and controlling peripherals. Such a processor may be any type of processor and may communicate (e.g., via bus 96) with network interface device 76 to transmit and receive signals (e.g., cellular, Bluetooth, Wi-Fi, WiLAN, or other communication signals) over a network 16. The processor may use main memory 78 and/or a cache to store operating instructions 80 and to help in the execution of the operating instructions (e.g., such as the temporary storage of calculations and the like). The processor may also use non-transitory storage 82 and/or long-term storage 84 (such as a flash drive, hard disk or other unit comprising a tangible machine readable medium 86) to store and read instructions, files, and other data that requires long term, non-volatile storage.

The processor may communicate and control other peripherals, such as a display 88 with associated touch screen sensor, causing images to be displayed on the display and receiving input from the touch screen sensor when a user presses on the touch-screen display. In some examples, a touch screen sensor may be a multi-touch sensor capable of distinguishing and processing gestures.

The processor may receive input from a physical keyboard 90 and/or mouse/touch pad 92. In other examples, the device may utilize a touch screen keyboard using the display and touch screen sensor. The processor may produce audio output and other alerts that are played on a speaker or other signal generation device 94. A microphone (not shown) may be used as an input device for the processor to receive commands using voice-processing software. In the case of a client 14, an accelerometer may provide input on the motion of the device to the processor. An accelerometer may be used in motion sensitive applications, or, for example, in connection with scrolling content using tilting gestures, etc.

A Bluetooth module may be used to communicate with Bluetooth-enabled external devices. A USB port may enable external connections to other devices (e.g., mice or other cursor control devices) supporting the USB standard and charging capabilities. An external storage module may include any form of removable physical storage media such as a flash drive, micro SD card, SD card, Memory Stick, and the like.

Certain embodiments are described herein as including logic or a number of components, modules, or mechanisms. Modules or components may constitute software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some example embodiments, the processor or processors may be located in a single location, while in other embodiments the processors may be distributed across a number of locations.

The one or more processors may also operate to support performance of the relevant operations in a "cloud computing" environment or as a "software-as-a-service" (SaaS) service. For example, at least some of the operations may be performed by a group of computers (as examples of machines including processors), with these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The foregoing description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. For example, the code can be stored on one or more non-transitory, or non-volatile tangible computer-readable media, and may be loaded into volatile media during execution or at other times (e.g., during a transfer between storage devices, etc.). Examples of these tangible computer-readable media can include, but are not limited to, hard disks, removable magnetic disks, removable optical disks (e.g., compact disks and digital video disks), magnetic cassettes, memory cards or sticks, read only memories (ROMs), flash memories or other solid state devices (SSDs) and the like.

What is claimed is:
1. A computer implemented method comprising:
receiving driving data from a plurality of vehicles being driving along a path, each of the vehicles of the plurality being driven by a driver, the driving data including vehicle location information;
categorizing the data into a plurality of maneuvers;
identifying a plurality of variables that describe the maneuvers and the received driving data;
building a road model for the path based on the identified variables and maneuvers, the road model including a set of reference trajectories for a subsequent vehicle being driven at an identical or similar location along the path;

receiving driving data from a vehicle separate from the plurality of vehicles as it is being driven on the path by its respective driver;

determining one or more characteristics of the driver of the plurality of drivers using the driving data received from the vehicle;

comparing the characteristics of the driver to the road model to determine driver behavior;

determining whether driver behavior is consistent with the road model; and executing an action in the vehicle responsively to the determination of whether the driver behavior is consistent with the road model, the action being at least one of providing a message to the driver and automatically adjusting an operation of the vehicle as it is driven.

2. The computer implemented method of claim 1, further comprising:
building a driver model for the driver using the driver behavior;
receiving driver data from a third party; and
updating the driver model to include the driver data received from the third party.

3. The computer implemented method of claim 1, further comprising:
building a driver model for the driver using the driver behavior;
receiving demographic data about the driver; and
segmenting the driver model based on the received demographic data.

4. The computer implemented method of claim 1, further comprising:
building a driver model for the driver using the driver behavior;
comparing the driver behavior with the driver model;
determining whether the driver behavior is consistent with the driver model; and
updating the execution of the action in the vehicle responsively to the determination of whether the driver behavior is consistent with the driver model.

5. The computer implemented method of claim 1, wherein the road model includes maneuvers, stopping locations, and actions to be performed upon approaching a stopping location.

6. The computer implemented method of claim 1, wherein the action to be performed is at least one of decreasing the speed of the vehicle, determining a location at which to begin decreasing the speed of the vehicle, and determining a location at which to come to a stop.

7. The computer implemented method of claim 1, further comprising:
determining one or more characteristics of a vehicle of the plurality of vehicles driven by the driver based on the driving data received from the vehicle;
comparing the characteristics of the vehicle to the road model to determine vehicle behavior; and
building a vehicle model for the vehicle responsive to the comparison of the characteristics of the vehicle to the road model.

8. The computer implemented method of claim 1, further comprising:
dynamically updating the road model based on conditions present on the path.

9. The computer implemented method of claim 1, further comprising:
determining one or more characteristics of a vehicle of the plurality of vehicles driven by the driver based on the driving data received from the vehicle;
comparing the characteristics of the vehicle to the road model to determine vehicle behavior;
building a vehicle model for the vehicle using the vehicle behavior;
comparing the vehicle behavior with the driver model and the road model;
determining whether the vehicle behavior is consistent with the driver model and the road model; and
updating the execution of the action in the vehicle responsively to the determination of whether the driver behavior is consistent with the driver model and the road model.

10. The computer implemented method of claim 1, further comprising:
predicting how the vehicle will be driven along the path based on at least one of the road model and the driver behavior; and
updating the execution of the action in the vehicle responsively to the prediction.

11. The computer implemented method of claim 1, wherein adjusting the operation of the vehicle as it is driven includes at least one of braking, continued application of cruise control, removal of cruise control, redirecting a trajectory of the vehicle, accelerating the vehicle, modifying an operation of sensor systems resident in the vehicle, modifying an operation of actuator systems resident in the vehicle, modifying a setting of the vehicles suspension apparatus, adjusting an operation of headlights resident in the vehicle, adjusting an operation of turn indicators, and adjusting a configuration of one or more components of the vehicle's powertrain.

12. The computer implemented method of claim 1, wherein adjusting the operation of the vehicle as it is driven is responsive to at least one of the road model, the characteristics of the driver, driver behavior, and a driver preference.

13. The computer implemented method of claim 1, further comprising:
selecting a driver model from a plurality of previously generated driver models using at least one of a characteristic of the driver driving the vehicle and the driver behavior;
comparing the characteristics of the driver to the selected driver model to determine driver behavior;
determining whether driver behavior is consistent with the driver model; and
executing a predetermined action in the vehicle responsively to the determination, the predetermined action being at least one of providing a message to the driver and automatically adjusting the operation of the vehicle as it is driven.

14. The computer implemented method of claim 1, wherein a plurality of road models for the path have been generated, the method further comprising:
selecting a road model of the plurality of road models prior to the comparison of the driver to the road model to determine driver behavior; and
comparing the characteristics of the driver to the selected road model to determine driver behavior.

15. The computer implemented method of claim 1, wherein the road model is selected responsively to a driver characteristic, the driver behavior, a vehicle characteristic, an environmental condition associated with the path, and a traffic congestion characteristic of the path.

16. The computer implemented method of claim 1, wherein the driving data received from the vehicle separate from the plurality further includes an indication of a driving condition along the path, the method further comprising:
determining whether driving condition is consistent with the road model, wherein the executed action is responsive the determination of whether driving condition is consistent with the road model.

17. A computer implemented method comprising:
- selecting a driver model from a plurality of driver models based on a characteristic of a driver driving a vehicle along a path;
- receiving driving data from the vehicle as it is being driven on the path;
- selecting a road model for the path based on a characteristic of at least one of the path, a driver of the vehicle, and an environmental condition present along the path;
- comparing the received driving data to the driver model and the road model to determine driver behavior;
- determining whether driver behavior is consistent with the driver model and the road model; and
- executing an action in the vehicle responsively to the determination, the action being at least one of providing a message to the driver and automatically adjusting an operation of the vehicle as it is driven.

18. The computer implemented method of claim 17, further comprising:
- comparing the characteristic of the driver to characteristics of the plurality of driver models prior to the selection of the driver model, where selection of the driver model is responsive to the comparison.

19. A computer implemented method comprising:
- selecting a vehicle model from a plurality of vehicle models based on a characteristic of a driver driving a vehicle;
- receiving driving data from the vehicle as it is being driven on a path by the driver;
- selecting a road model for the path based on a characteristic of at least one the path, a driver of the vehicle, and an environmental condition present along the path;
- comparing the received driving data to the vehicle model and the road model to determine vehicle behavior;
- determining whether vehicle behavior is consistent with the vehicle model and the road model; and
- executing an action in the vehicle responsively to the determination, the action being at least one of providing a message to the driver and automatically adjusting an operation of the vehicle as it is driven.

20. The computer implemented method of claim 19, further comprising:
- comparing the characteristic of the vehicle to characteristics of the plurality of vehicle models prior to the selection of the vehicle model, where selection of the vehicle model is responsive to the comparison.

* * * * *